(12) United States Patent
Kawasaki

(10) Patent No.: US 8,010,049 B2
(45) Date of Patent: Aug. 30, 2011

(54) SUB-BAND NOTIFICATION METHOD AND TERMINAL APPARATUS

(75) Inventor: Yoshihiro Kawasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1323 days.

(21) Appl. No.: 11/477,521

(22) Filed: Jun. 30, 2006

(65) Prior Publication Data

US 2007/0232238 A1    Oct. 4, 2007

(30) Foreign Application Priority Data

Mar. 28, 2006  (JP) ................................. 2006-087365

(51) Int. Cl.
  *H04B 15/00*  (2006.01)
(52) U.S. Cl. ..... 455/62; 455/63.1; 455/63.3; 455/67.11; 455/69
(58) Field of Classification Search ............... 455/67.11, 455/450, 515, 63.1, 66.1, 62, 63.3, 69; 370/486, 370/329, 208; 375/135, 260
See application file for complete search history.

(56) References Cited

U.S. PATENT DOCUMENTS

| | | | |
|---|---|---|---|
| 6,219,559 B1 * | 4/2001 | Hill et al. ....................... | 455/522 |
| 7,020,110 B2 * | 3/2006 | Walton et al. .................. | 370/342 |
| 7,126,996 B2 * | 10/2006 | Classon et al. ................ | 375/260 |
| 7,203,508 B2 * | 4/2007 | Ohkubo et al. ............... | 455/510 |
| 7,359,327 B2 * | 4/2008 | Oshiba .......................... | 370/235 |
| 7,392,014 B2 * | 6/2008 | Baker et al. ................. | 455/67.11 |
| 2003/0227897 A1 | 12/2003 | Okada | |
| 2004/0081123 A1 * | 4/2004 | Krishnan et al. .............. | 370/329 |
| 2004/0203979 A1 * | 10/2004 | Attar et al. ..................... | 455/522 |
| 2005/0053038 A1 * | 3/2005 | Kimura ......................... | 370/333 |
| 2005/0201296 A1 * | 9/2005 | Vannithamby et al. ....... | 370/241 |
| 2005/0232135 A1 * | 10/2005 | Mukai et al. .................. | 370/208 |
| 2005/0286465 A1 * | 12/2005 | Zhuang ......................... | 370/329 |
| 2006/0140251 A1 * | 6/2006 | Brown et al. ................. | 375/135 |
| 2006/0223449 A1 * | 10/2006 | Sampath et al. .............. | 455/69 |
| 2007/0002898 A1 * | 1/2007 | Boariu et al. ................. | 370/468 |
| 2007/0097942 A1 * | 5/2007 | Gorokhov et al. ............ | 370/342 |
| 2007/0098098 A1 * | 5/2007 | Xiao et al. .................... | 375/260 |
| 2007/0217540 A1 * | 9/2007 | Onggosanusi et al. ....... | 375/267 |

* cited by examiner

*Primary Examiner* — Edward Urban
*Assistant Examiner* — Ganiyu Hanidu
(74) *Attorney, Agent, or Firm* — Myers Wolin, LLC.

(57) ABSTRACT

The present invention relates to a sub band notification method and apparatus in which a terminal notifies a base station of an optimum sub band that is determined based on radio link quality of a plurality of sub bands. The terminal apparatus measures the radio link quality of a current sub band that is currently assigned to it, and the radio link quality of the sub bands on both sides of the current sub band, compares the radio link quality of each sub band, then generates sub-band-change-request data that specifies that the optimum sub band is the sub band having a higher frequency than the current sub band, or the sub band having a lower frequency, and transmits that sub-band-change-request data to the base station.

15 Claims, 16 Drawing Sheets

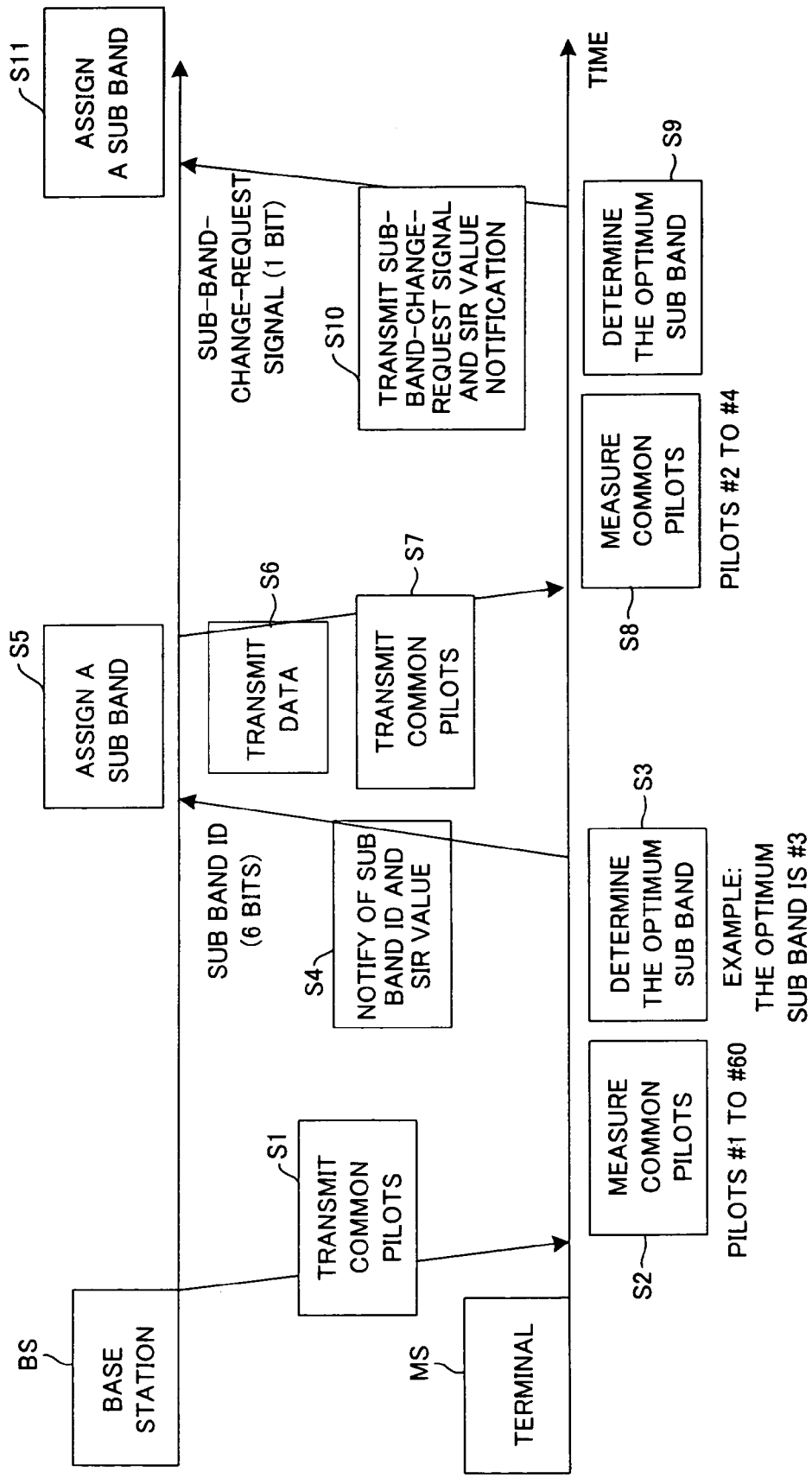

| REQUEST CONTENTS | TRANSMISSION BIT |
|---|---|
| DESIRE TO SHIFT TO THE SUB BAND ON THE LOW SIDE | 0 |
| DESIRE TO SHIFT TO THE SUB BAND ON THE HIGH SIDE | 1 |

(B)

| REQUEST CONTENTS | TRANSMISSION BIT |
|---|---|
| MAINTAIN CURRENT SUB BAND | 00 |
| DESIRE TO SHIFT TO THE SUB BAND ON THE LOW SIDE | 10 |
| DESIRE TO SHIFT TO THE SUB BAND ON THE HIGH SIDE | 01 |

(C)

| REQUEST CONTENTS | TRANSMISSION BIT |
|---|---|
| MAINTAIN CURRENT SUB BAND | 000 |
| DESIRE TO SHIFT TO THE NEXT ADJACENT SUB BAND ON THE LOW SIDE | 110 |
| DESIRE TO SHIFT TO THE ADJACENT SUB BAND ON THE LOW SIDE | 010 |
| DESIRE TO SHIFT TO THE NEXT ADJACENT SUB BAND ON THE HIGH SIDE | 001 |
| DESIRE TO SHIFT TO THE ADJACENT SUB BAND ON THE HIGH SIDE | 011 |

SUB-BAND NOTIFICATION METHOD AND TERMINAL APPARATUS

BACKGROUND OF THE INVENTION

This invention relates to a sub-band notification method and terminal apparatus, and more particularly to a sub-band notification method and terminal apparatus of a cellular system that performs frequency domain scheduling based on the radio link quality of the downlink, and adaptively assigns a sub band to each terminal.

In an EUTRAN (Evolved UTRAN) system (see 3GPP TR 25.814 V7.0.0 (2006-6)) that is being studied as a next-generation type 3GPP system, scheduling is performed for both the downlink from a base station to a mobile station and the uplink from a mobile station to the base station, in the frequency domain as well as in the time domain. In other words, the transmission bands for both the downlink and uplink are divided into a plurality of sub bands, and basically, the sub bands having the best quality are assigned to the terminals (mobile stations) and data is transmitted.

In the downlink, a predetermined common pilot is transmitted from the base station at a fixed period over the entire transmission band. FIG. 17 shows an example of a radio frame in the downlink, and in each sub band, after each set period, or in other words after each TTI (Transmission Time Interval), a common pilot, control signal, user data and the like are transmitted. The control signal contains user ID information that indicates which terminal apparatus (mobile station) the user data transmitted in the TTI is for. By decoding the control signal and checking that user ID information, each terminal is able to determine whether or not it decodes the following user data that is also contained in that same TTI.

As shown in FIG. 18, by performing radio measurement (SNR or SIR measurement) of the common pilots (pilot #1 to pilot #60) for each sub band, each terminal MS is able to know which band has the best quality for the terminal. Each terminal MS reports all or part of the radio measurement results as is, or converts the radio measurement results into a different format and reports the results to the base station BS. By doing so, it becomes possible for the base station BS to transmit individual data (dedicated data) to the terminals using sub bands having the best quality for each respective terminal MS (scheduled transmission by the base station). Various methods have been considered as the method used by the terminal MS to designate the format of the measured results and to report the results to the base station BS, however, a typical method is a method as shown in FIG. 18 in which the ID number of the sub-band having the very best quality and the radio measurement results are transmitted to the base station BS in the uplink.

In EUTRAN, it is assumed that both the downlink and uplink have a maximum of a 20 MHz transmission bandwidth as shown in FIG. 17. The bandwidth of the sub bands in the downlink is assumed to be in the range of 300 kHz to 400 kHz, and the number of sub bands in a transmission band having a transmission bandwidth of 20 MHz is about 50 to 60 bands. When an ID number is assigned to a sub band, the length of the signal indicating that ID number is 6 bits when the addition of CRC (cyclic redundancy check) code and code processing are not performed.

Generally, the data transmission characteristics in the downlink improves as the frequency of reporting the measurement results from the terminal MS to the base station BS increases. This is because the amount of time in which the optimum sub band is used for transmitting data to the terminal increases. In other words, this is because when transmitting data to the terminal, the probability that the optimum sub band will be used increases. When a sub band having good quality is used, it becomes possible to perform data transmission at a high data rate, and as a result, the data throughput characteristics improve. However, the higher the frequency that measurement results are reported from the terminal MS to the base station BS, the radio resource consumption in the uplink increases. Taking into consideration the radio resource consumption in the uplink, the frequency of reporting measurement results is decreased, however, that causes degradation of the downlink data transmission characteristics.

As prior art there is a multi-frequency-load-sharing method in a mobile communication system (see Japan patent application 2004-15697). This multi-frequency-load-sharing method makes it possible to share the load of a plurality of frequencies by assigning and using a frequency according to the state of use of all of the frequencies in response to a request from a call-control-processing unit. However, in this prior art, the base station does not perform frequency-domain scheduling based on the radio link quality of the downlink which is reported from the terminal, and does not adaptively assign a sub band for each terminal. Moreover, the base station does not suppress an increase in radio resource consumption in the uplink, even though the frequency of reporting measurement results of the radio link quality to the base station from the terminal is increased.

When transmitting data from a base station to a terminal, the quality of the sub band used for transmitting the data changes over time, however, it is often the case that the quality of a sub band adjacent to or near the current sub band being used becomes better. However, when it is desired to use that adjacent sub band, using 6 bits to report the ID number of that sub band is not preferable when radio resource consumption of the uplink is considered. If it were possible to effectively reduce the number of bits used for specifying the sub band, it would not be necessary to reduce the frequency of reporting measurement results from the terminal to the base station, and it would become possible to improve the data transmission characteristics of the downlink.

SUMMARY OF THE INVENTION

Taking the above into consideration, it is the object of the present invention to effectively reduce the number of bits used for specifying a sub band.

Moreover, another object of the present invention is to perform pilot measurement of all sub bands only periodically or when the radio communication environment becomes poor, so that it is no longer necessary to always perform pilot measurement of all sub bands.

This invention is a sub band notification method and terminal apparatus for notifying a base station of an optimum sub band that is determined based on the radio quality of a plurality of sub bands.

The sub band notification method of this invention comprises: a step of measuring the radio quality of a terminal for a current sub band that is currently assigned to the terminal and for the sub bands on both sides of the current sub band; a step of comparing the radio quality of each sub band, and generating sub-band-change-request data that specifies that the optimum sub band is the sub band having a higher frequency than the current sub band, or the sub band having a lower frequency; and a step of transmitting that sub-band-change-request data to the base station.

The sub band notification method of this invention described above further comprises: a measurement-mode change judgment unit that determines whether conditions are satisfied for changing to a second mode, in the first mode, the radio quality of the current sub band and the sub bands on both sides of the current sub band are compared and said sub-band-change-request data is transmitted to the base station, and in the second mode the radio quality for all of the sub bands are measured and the base station is notified of the ID number of the sub band having the best radio quality, wherein when said conditions are satisfied, said optimum-sub-band-determination unit refers to the radio quality of all of the sub bands that are output from said radio-quality-measurement unit, and determines the sub band having the best quality as the optimum sub band, and said transmission unit notifies the base station of the ID number of that sub band.

The sub band notification method of this invention described above further comprises: a step of saving the sub-band ID number after the ID number of the sub band having the best radio-line quality is received from the terminal, and transmitting data to that terminal using that sub band; a step of updating the saved optimum sub band based on received data when control data is received from the terminal specifying that the optimum sub band is the sub band having a higher frequency than the current sub band, or the sub band having a lower frequency; and a step of transmitting data to the terminal using the updated sub band.

The terminal apparatus of the present invention comprises; a radio-quality-measurement-unit that measures the radio link quality of a current sub band that is currently assigned to the terminal apparatus and the radio link quality of sub bands on both sides of the current sub band; an optimum-sub-band-determination unit that compares the line quality of each sub band, and determines whether the optimum sub band is the sub band having a higher frequency than the current sub band, or the sub band having a lower frequency; and a transmission unit that generates sub-band-change-request data based on the determination result, and transmits said sub-band-change-request data to the base station.

The terminal apparatus of the present invention further comprises: a measurement-mode-change-judgment unit that monitors a first mode, in which the radio link quality of the current sub band and the sub bands on both sides of that sub band are compared and said sub-band-change-request data is transmitted to the base station, and determines whether conditions are satisfied for changing to a second mode, in which the base station is notified of the ID number of the sub band having the best radio link quality of all of the sub bands; and wherein when the conditions are satisfied, the optimum-sub-band-determination unit compares the radio link quality of all of the sub bands that are output from the radio-quality-measurement-unit, and determines the sub band having the best quality as the optimum sub band, and the transmission unit notifies the base station of the ID number of that sub band.

With this invention, the radio link quality of a terminal is measured for current sub band that is currently assigned to the terminal and for the sub bands on both sides of current sub band, the radio link quality is compared for all sub bands, sub-band-change-request data is generated that specifies whether the optimum sub band is the sub band having higher frequency than the current sub band, or the sub band having lower frequency, said sub-band-change-request is transmitted from the terminal to a base station, so it is possible to express that sub-band-change-request data in a small number of bits, and thus it is possible to suppress an increase in the amount of radio resources consumed even if measurement results are reported frequently from a terminal to a base station, and it becomes possible to improve transmission characteristics in the downlink.

Also, with this invention it is not necessary to always perform pilot measurement of all sub bands, and pilot measurement is performed for all sub bands only periodically or when the radio communication environment becomes poor, so it is possible to determine the optimum sub band with good reliability and notify a base station of the optimum sub band even if pilot measurement is not performed for all sub bands all the time.

Other features and advantages of the present invention will be apparent from the following descriptions taken in conjunction with the accompanying drawings.

BRIEF DESCRIPTION OF THE DRAWINGS

FIG. 1 is a drawing explaining the theory of the present invention.

FIG. 2 is a drawing explaining the sub-band-change-request command.

Figure 3:
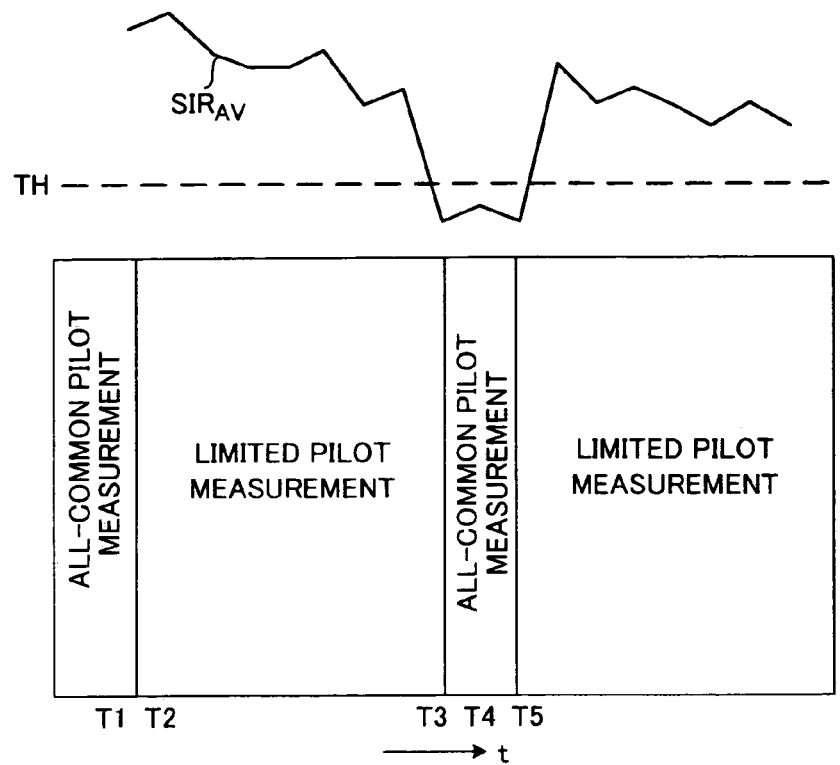
FIG. 3 is a drawing explaining a first embodiment in which a terminal uses together both an all-common pilot measurement mode and a limited pilot measurement mode to notify a base station of the optimum sub band.

DESCRIPTION OF THE PREFERRED EMBODIMENTS (A) Theory of the Invention

FIG. 1 is a drawing explaining the theory of the present invention. The following explanation is based on dividing the transmission band into 60 sub bands. However, the present invention is not dependent on a number of 60 sub-bands. At the beginning of transmission, the terminal MS receives the common pilots #1 to #60 of all of the sub bands #1 to #60 that are sent from the base station BS (S1), and performs radio measurement (SNR or SIR measurement) for the common pilots #1 to #60 every specified minimum measurement time unit (TTI) (S2). Also, the terminal MS determines the sub band for which the radio link quality is the best (S3), and reports the ID number of that sub band and the SIR value to the base station BS (S4). However, the terminal MS can also convert the radio measurement results to another format (for example, an index in a pre-defined table, etc.) and report that to the base station BS. Supposing that sub band #3 is the optimum sub band, the ID number of this sub band #3 is expressed using 6 bits, and together with the radio measurement results, for example, the SIR value, is notified to the base station BS in step S4.

The base station BS receives notifications from each of the terminals, and assigns the optimum sub band for each terminal (S5), and together with transmitting data to the terminal using that sub band (S6), transmits the common pilots #1 to #60 of all of the sub bands #1 to #60 (S7). In the case where the optimum sub band notified from a plurality of terminals is the same sub band, the timing for transmitting data to those terminals is made different (time-division multiplexing).

Since the common pilots #1 to #60 of all of the sub bands are sent from the base station BS, the terminal MS performs radio measurement every specified minimum measurement time unit (TTI) for the sub band (#3) which is used for transmitting data to the terminal in the current downlink, as well as the adjacent sub bands on both sides (#2, #4), for a total of 3 sub bands (S8). Based on the measurement results, the terminal MS compares the SIR of the sub band (current sub band) currently being used with the SIR of both adjacent sub bands, and determines the optimum sub band (S9). After finding the optimum sub band, the terminal MS compares the frequency of the current sub band with that of the optimum sub band, and generates a 1-bit long sub-band-change-request command (+1, −1) requesting that the sub band be changed to the sub band with the higher frequency, or to the sub band with the lower frequency (see (A) of FIG. 2), and together with the SIR, notifies the base station BS in the uplink (S10). However, the terminal MS can also convert the radio measurement result to another format (for example, an index in a pre-defined table, etc.) and report that to the base station BS. The base station BS receives the sub-band-change-request command from the terminal MS, and based on that command, assigns the adjacent sub band having the frequency higher or the adjacent sub band having the frequency lower than that of the current sub band to the terminal(S11), and transmits data to the terminal in that sub band, and then repeats the aforementioned sequence.

In step S9, when the difference between the measurement results of the common pilots transmitted in both adjacent sub bands and the measurement results of the common pilots transmitted in the sub band being used in the current transmission exceeds a certain threshold value, the sub-band-change request is performed. In this case, taking into consideration that the measurement result instantaneously exceeds the threshold value, it is best to take the running average over a plurality of continuous minimum measurement time units.

In (A) of FIG. 2, the sub-band-change-request command (+1, −1) is expressed in 1 bit, and depending on that command, a request is made to change the sub band to the sub band having the higher frequency or to the sub band having the lower frequency, however, as shown in (B) of FIG. 2, it is also possible to express the sub-band-change-request command in 2 bits. In this case, depending on the sub-band-change-request command, it is possible to request the base station to change the sub band to the sub band having the higher frequency or the lower frequency, and it is also possible to request the base station not to change the sub band.

Also, as shown in (C) of FIG. 2, it is also possible to express the sub-band-change-request command in 3 bits. In this case, depending on the sub-band-change-request command, it becomes possible to request that the sub band be changed to not only the adjacent sub bands, but also to the next adjacent sub bands as well.

Moreover, in both (A) and (B) of FIG. 2, it is possible to perform a request to change the sub band to the +nth/−nth adjacent sub band. For example, in (A) of FIG. 2, supposing that n=2, when the sub-band-change-request command being '0' means that the next adjacent sub band having a lower frequency is specified, and when the command being '1' means that the next adjacent sub band having a higher frequency is specified. The value n is set beforehand (for example is indicated in the specifications), or is adaptively set according to the radio link quality, etc. In the latter case, the base station (including a control device on the network) or the terminal sets the value n according to a specified algorithm.

In order to determine the sub band, the relative sub band decision methods shown in any one of (A) to (C) of FIG. 2, and a direct sub band decision method that uses the ID number to specify the sub band are used together. At the start of data transmission, the terminal MS performs radio measurement for all of the sub bands and notifies the base station BS of the ID number of the optimum sub band (all-common pilot measurement mode). After that, the terminal MS performs the sub-band-change request using the relative sub band decision method (limited pilot measurement mode). However, when it is no longer desirable to specify the sub band using the limited pilot measurement mode, the terminal MS changes back to the all-common pilot measurement mode, and after that, changes again to the limited pilot measurement mode.

(B) First Embodiment

FIG. 3 is a drawing explaining a first embodiment of the present invention in which a terminal uses together both an all-common pilot measurement mode and a limited pilot measurement mode to notify a base station of the optimum sub band.

(a) Overview of the First Embodiment

At the start of data transmission (T1), the terminal MS is in the all-common pilot measurement mode, and performs radio measurement for all sub bands, determines the optimum sub band, and then notifies the base station BS of the ID number for that optimum sub band. After that (T2 to T3), the terminal MS is in the limited pilot measurement mode and using the relative sub band decision method, sends a sub-band-change request to the base station BS. In this limited pilot measurement mode, the terminal MS monitors whether the limited pilot measurement mode has become undesirable, and when it is undesirable, the terminal changes back to the all-common pilot measurement mode (T4), and after that changes back again to the limited pilot measurement mode (T5 on).

The conditions making the limited pilot measurement mode undesirable are:

(1) The average value $SIR_{AV}$ of the radio measurement values for the sub band currently being used for transmitting data to the interested terminal and both adjacent sub bands is a threshold value TH or less; or (2) The best radio measurement value among the radio measurement values for the sub band currently being used for transmitting data to the interested terminal and both adjacent sub bands is less than a threshold value; or (3) The data reception success rate in the downlink by the interested terminal is less than a threshold value.

The measurement values used in these conditional judgments can be running averages over a plurality of minimum measurement time units (TTI or the like).

(b) Control Data CNT and User Data DT

Figure 4:
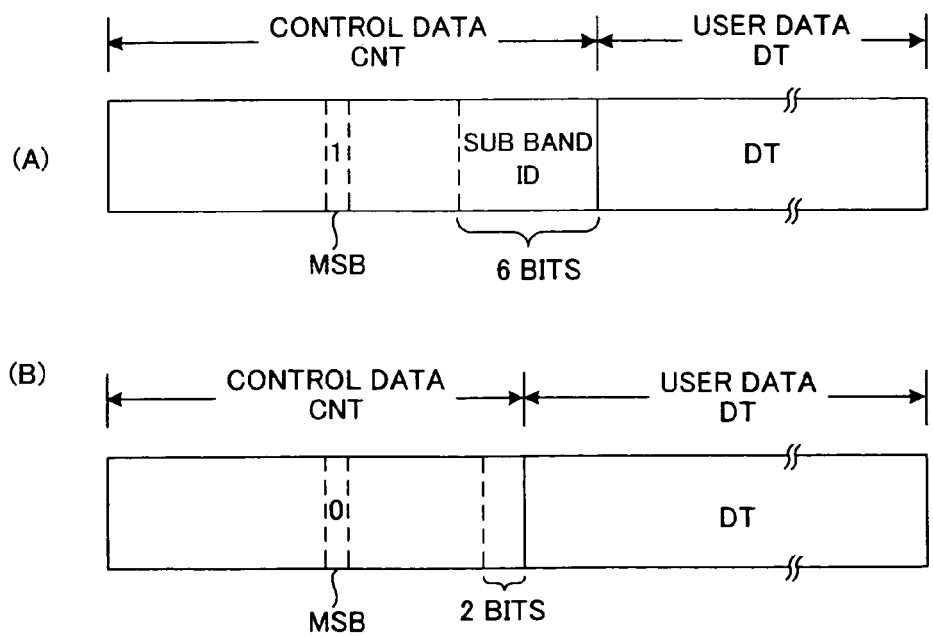
FIG. 4 is a drawing explaining the format of control data and user data that specifies the optimum sub band in both the all-common pilot measurement mode and limited pilot measurement mode.

FIG. 4 is a drawing explaining the format of control data CNT and user data DT that specify the optimum sub band in both the all-common pilot measurement mode and limited pilot measurement mode. The format shown here is just one example. As shown in (A) of FIG. 4, in the all-common pilot measurement mode the mode-setting bit MSB is set to '1', and the sub band ID number is mapped on the last 6 bits of the control information and transmitted. Also, as shown in (B) of FIG. 4, in the limited pilot measurement mode, the mode-setting bit MSB is set to '0', and the sub-band-change-request command shown in (B) of FIG. 2 is mapped on the last 2 bits of the control information and transmitted. As a result, in the limited pilot measurement mode it is possible to reduce the number of bits used by 4 bits compared with transmitting the sub band ID number, and it is possible to increase user data by that amount.

(c) Processing Flow

Figure 5:
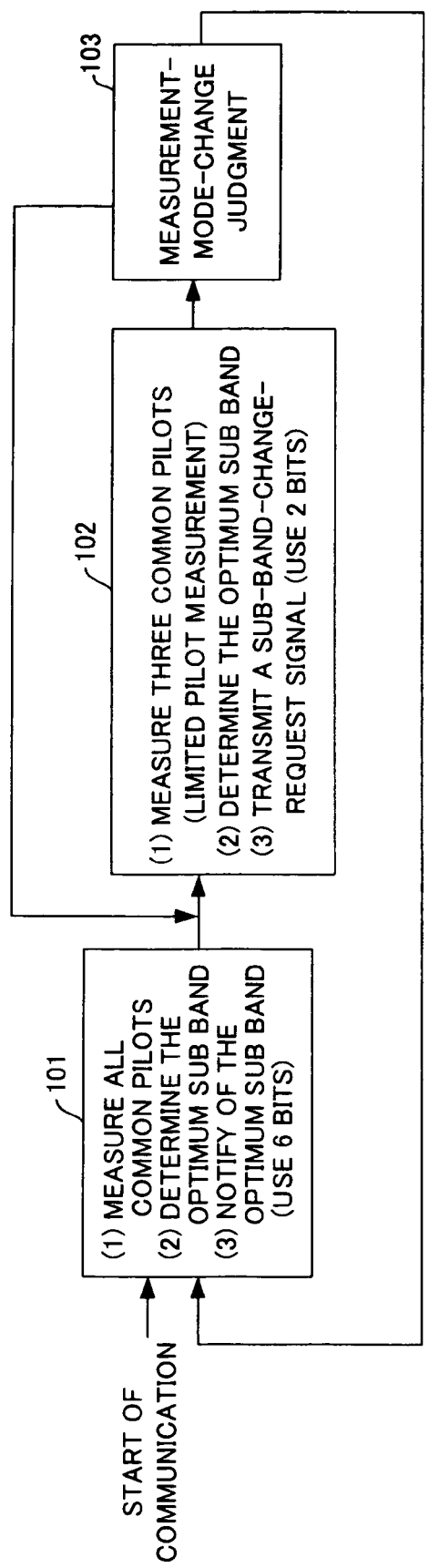
FIG. 5 is a flowchart showing the processing flow of the terminal MS that uses together both an all-common pilot measurement mode and a limited pilot measurement mode to notify the base station of the optimum sub band.

FIG. 5 is a flowchart showing the processing flow of the terminal MS that uses together both an all-common pilot measurement mode and a limited pilot measurement mode to notify the base station of the optimum sub band. The transmission band is divided into 60 sub bands, however, the number of sub bands in the transmission band is not particularly limited.

At the start of data transmission, the terminal MS is in the all-common pilot measurement mode, and: (1) performs radio measurement (for example, SIR measurement) of all of the sub bands using the common pilots Pilot #1 to Pilot #60 of all of the sub bands; (2) determines the optimum sub band based on the measurement results; and (3) notifies the base station BS of the ID number for the optimum sub band using 6 bits as shown in (A) of FIG. 4 (step 101).

After that, the terminal MS changes to the limited pilot measurement mode, and after each TTI: (1) performs radio measurement of the sub band currently being used and both adjacent sub bands; (2) determines the optimum sub band of the three; and (3) generates a sub-band-change-request command based on the determined result (see (B) of FIG. 2) and uses that command to request the base station to change the sub band to the sub band having the higher frequency, or to request the base station to change the sub band to the sub band having the lower frequency or request the base station not to change the sub band (step 102).

In the limited pilot measurement mode of step 102, the terminal MS monitors whether the limited pilot measurement mode becomes undesirable (step 103), and when the limited pilot measurement mode becomes undesirable, the terminal MS changes back to the all-common pilot measurement mode (step 101), and then changes back again to the limited pilot measurement mode (step 102). Thereafter the operation described above is repeated.

(d) Terminal Construction

Figure 6:
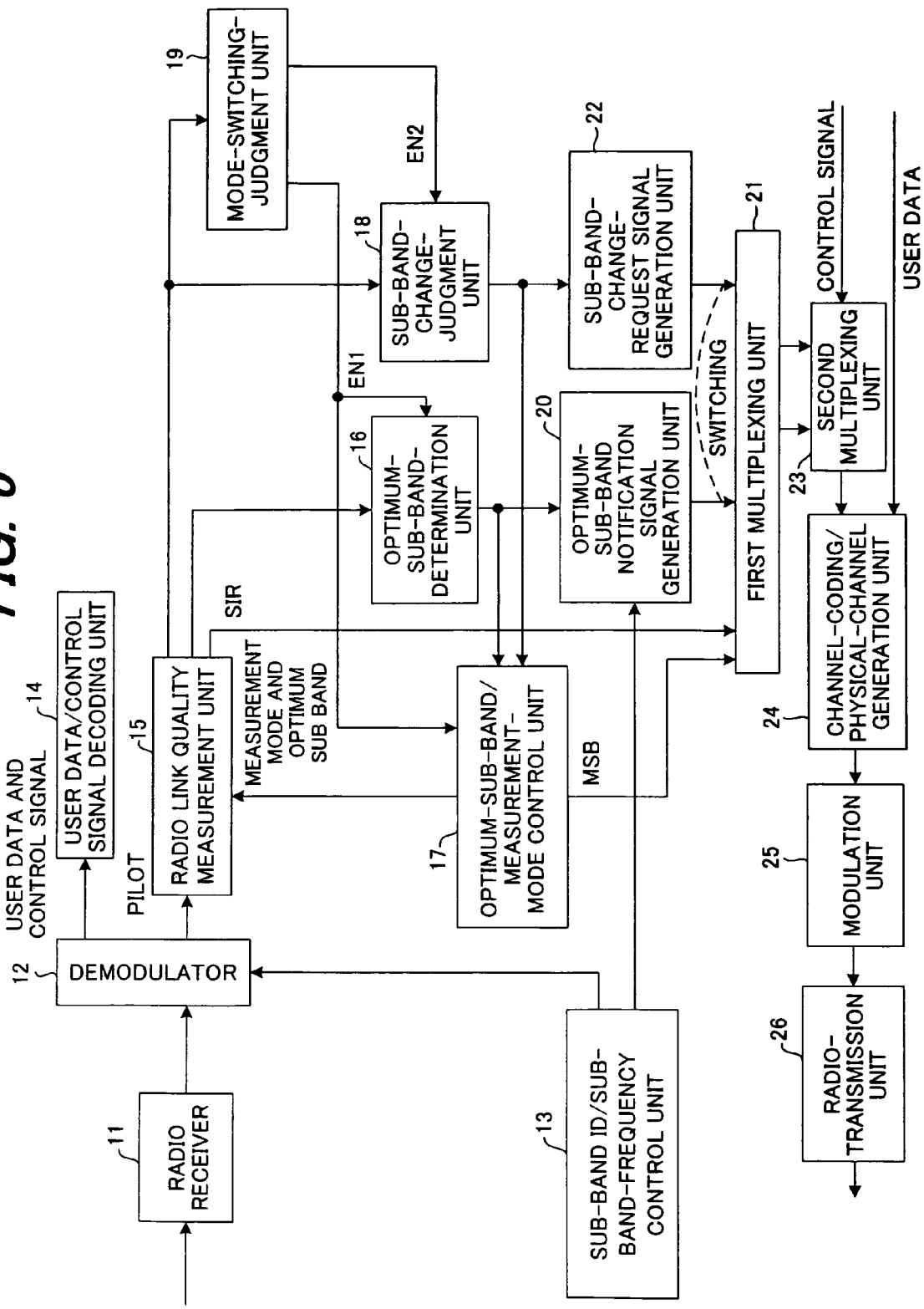
FIG. 6 is a drawing showing the construction of the terminal of a first embodiment of the invention.

FIG. 6 is a drawing showing the construction of a terminal MS.

A radio receiver 11 receives a radio signal from the base station and converts the frequency to a baseband signal, a demodulator 12 demodulates the signal of the sub bands #1 to #60 included in the baseband signal based on sub band frequency data that are input from a sub-band-ID/sub-band-frequency control unit 13, and separates the result into user data/control signals and pilot signals for each sub band, and inputs them to a user data/control signal decoding unit 14 and radio link quality measurement unit 15.

In the all-common pilot measurement mode, the radio link quality measurement unit 15 uses the common pilots Pilot #1 to Pilot #60 of all the sub bands to measure the radio link quality (for example, SIR or SNR) of all the sub bands, and inputs the results to an optimum-sub-band-determination unit 16. Also, in the limited pilot measurement mode, the radio link quality measurement unit 15 uses the three common pilots #i−1 to #i+1 of the optimum sub band and both adjacent sub bands to measure the radio link quality of the sub bands, and inputs the measurement results to a sub-band-change-judgment unit 18 and mode-switching-judgment unit 19. Moreover, in each measurement mode, the radio link quality measurement unit 15 outputs the SIR value of the sub band determined to be the optimum sub band.

When the measurement mode is the all-common pilot measurement mode, the mode-switching-judgment unit 19 inputs a high-level enable signal EN1 to the optimum-sub-band-determination unit 16, and when the measurement mode is the limited pilot measurement mode, inputs a high-level enable signal EN2 to the sub-band-change-judgment unit 18. Moreover, in the limited pilot measurement mode, the mode-switching-judgment unit 19 monitors whether the conditions for switching the measurement mode to the all-common measurement mode are satisfied, and when the conditions are satisfied, it inputs the measurement-mode change to an optimum-sub-band/measurement-mode control unit 17, then sets the enable signal EN1 to high level and sets the enable signal EN2 to low level.

The optimum-sub-band-determination unit 16 determines the optimum sub band based on the measurement results of all sub bands and inputs the result to the optimum-sub-band/ measurement-mode control unit 17 and optimum-sub-band notification signal generation unit 20.

Together with controlling the measurement mode and optimum sub band, the optimum-sub-band/measurement-mode control unit 17 inputs the measurement mode to the radio link quality measurement unit 15, and inputs the optimum sub band in the limited pilot measurement mode to the radio link quality measurement unit 15. The optimum-sub-band notification signal generation unit 20 receives a notification of the optimum sub band from the optimum-sub-band-determination unit 16 and acquires the ID number for that optimum sub band from the sub-band-ID/sub-band-frequency control unit 13 and inputs that ID number to a first multiplexing unit 21.

In the limited pilot measurement mode, the sub-band-change-judgment unit 18 compares the input measurement results of three sub bands, determines the optimum sub band from among the three and inputs the result to the optimum-sub-band/measurement-mode control unit 17 and sub-band-change-request signal generation unit 22. The optimum-sub-band/measurement-mode control unit 17 updates the optimum sub band based on the output signal from the sub-band-change-judgment unit 18, and inputs that optimum sub band to the radio link quality measurement unit 15.

The sub-band-change-request signal generation unit 22 generates a sub-band-change-request command based on the input optimum sub band, and inputs the command to the first multiplexing unit 21. This sub-band-change-request command requests the base station to change from the sub band currently used to a sub band having a higher frequency, or requests that sub band be changed to a sub band having a lower frequency, or requests that the sub band not be changed.

The first multiplexing unit 21 multiplexes (1) the measurement mode (mode-setting bit) that is input from the optimum-sub-band/measurement-mode control unit 17, (2) the sub-band-ID number that is input from the optimum-sub-band notification signal generation unit 20, or the sub-band-change-request command that is input from the sub-band-change-request signal generation unit 22, and (3) the SIR value of the optimum sub band. However, it is also possible to convert the SIR value of the optimum sub band to another format (for example, an index in a pre-defined table).

A second multiplexing unit 23 places the sub-band-related data that is input from the first multiplexing unit 21 in a specified location in the control signal, and a channel-coding/physical-channel generation unit 24 performs channel encoding of the control signal and user data, and generates a specified physical channel data. A modulation unit 25 modulates all of the physical-channel data, and a radio-transmission unit 26 performs up conversion of the modulated data frequency to a radio frequency and transmits the signal to the base station from an antenna.

(e) Terminal Operation

At the start of data transmission, the optimum-sub-band/measurement-mode control unit 17 inputs the all-common pilot measurement mode to the radio link quality measurement unit 15 as the measurement mode. The radio link quality measurement unit 15 measures the radio link quality (for example, SIR or SNR) of each sub band using the common pilots Pilot #1 to #60 of all sub bands, and inputs the results to the optimum-sub-band-determination unit 16.

At the start of data transmission, the enable signal EN1 is high level, so after the measurement results for all of the sub bands are input, the optimum-sub-band-determination unit 16 determines the optimum sub band #i based on these measurement results, and inputs that optimum sub band to the optimum-sub-band/measurement-mode control unit 17 and optimum-sub-band notification signal generation unit 20. The optimum-sub-band notification signal generation unit 20 acquires the ID number of the optimum sub band and inputs it to the first multiplexing unit 21. After that, the terminal transmits the ID number for that optimum sub band to the base station.

Moreover, after the optimum sub band #i is input, the optimum-sub-band/measurement-mode control unit 17 saves it, then changes the measurement mode to the limited pilot measurement mode and inputs the limited pilot measurement mode and optimum sub band to the radio link quality measurement unit 15.

After that, in the limited pilot measurement mode, the radio link quality measurement unit 15 measures the radio link quality of each sub band using the three pilots Pilot #i−1 to #+1 of the optimum sub band #i and both adjacent sub bands, and inputs the measurement result to the sub-band-change-judgment unit 18 and mode-switching-judgment unit 19.

In the limited pilot measurement mode, the mode-switching-judgment unit 19 monitors the measurement results of the three sub bands to determine whether conditions for switching to the all-common pilot measurement mode have been satisfied, and when the conditions are not satisfied, it inputs the high-level enable signal EN2 to the sub-band-change-judgment unit 18. By doing so, in the limited pilot measurement mode, the sub-band-change-judgment unit 18 compares the input measurement results for the three sub bands, then determines the optimum sub band from among the three and inputs the result to the optimum-sub-band/measurement-mode control unit 17 and sub-band-change-request signal generation unit 22. The optimum-sub-band/measurement-mode control unit 17 updates the optimum sub band based on the input signal, and inputs that optimum sub band to the radio link quality measurement unit 15. On the other hand, the sub-band-change-request signal generation unit 22 generates a sub-band-change-request command (see (B) of FIG. 2) based on the input optimum sub band, and inputs it to the first multiplexing unit 21. After that, the terminal transmits that sub-band-change-request command to the base station.

Moreover, in the limited pilot measurement mode, after the mode-switching-judgment unit 19 determines that the conditions for switching to the all-common pilot measurement mode have been satisfied, inputs the measurement-mode change to the optimum-sub-band/measurement-mode control unit 17, then sets the enable signal EN1 to high level and sets the enable signal EN2 to low level. The optimum-sub-band/measurement-mode control unit 17 immediately inputs the all-common pilot measurement mode to the radio link quality measurement unit 15 as the measurement mode. By doing so, the radio link quality measurement unit 15 measures the radio link quality of each sub band using the common pilots Pilot #1 to #60 of all the sub bands, and inputs the results to the optimum-sub-band-determination unit 16.

The optimum-sub-band-determination unit 16 determines the optimum sub band #j based on the measurement results for all the sub bands, and inputs that optimum sub band to the optimum-sub-band/measurement-mode control unit 17 and optimum-sub-band notification signal generation unit 20. The optimum-sub-band notification signal generation unit 20 acquires the ID number of the optimum sub band and inputs it to the first multiplexing unit 21. After that, the terminal transmits the ID number of the optimum sub band to the base station. Also, after the optimum sub band #j has been input, the optimum-sub-band/measurement-mode control unit 17 saves it, then changes the measurement mode to the limited pilot measurement mode and inputs the limited pilot measurement mode and optimum sub band #j to the radio link quality measurement unit 15. After that, the operation described above is repeated.

(f) Base Station Construction

Figure 7:
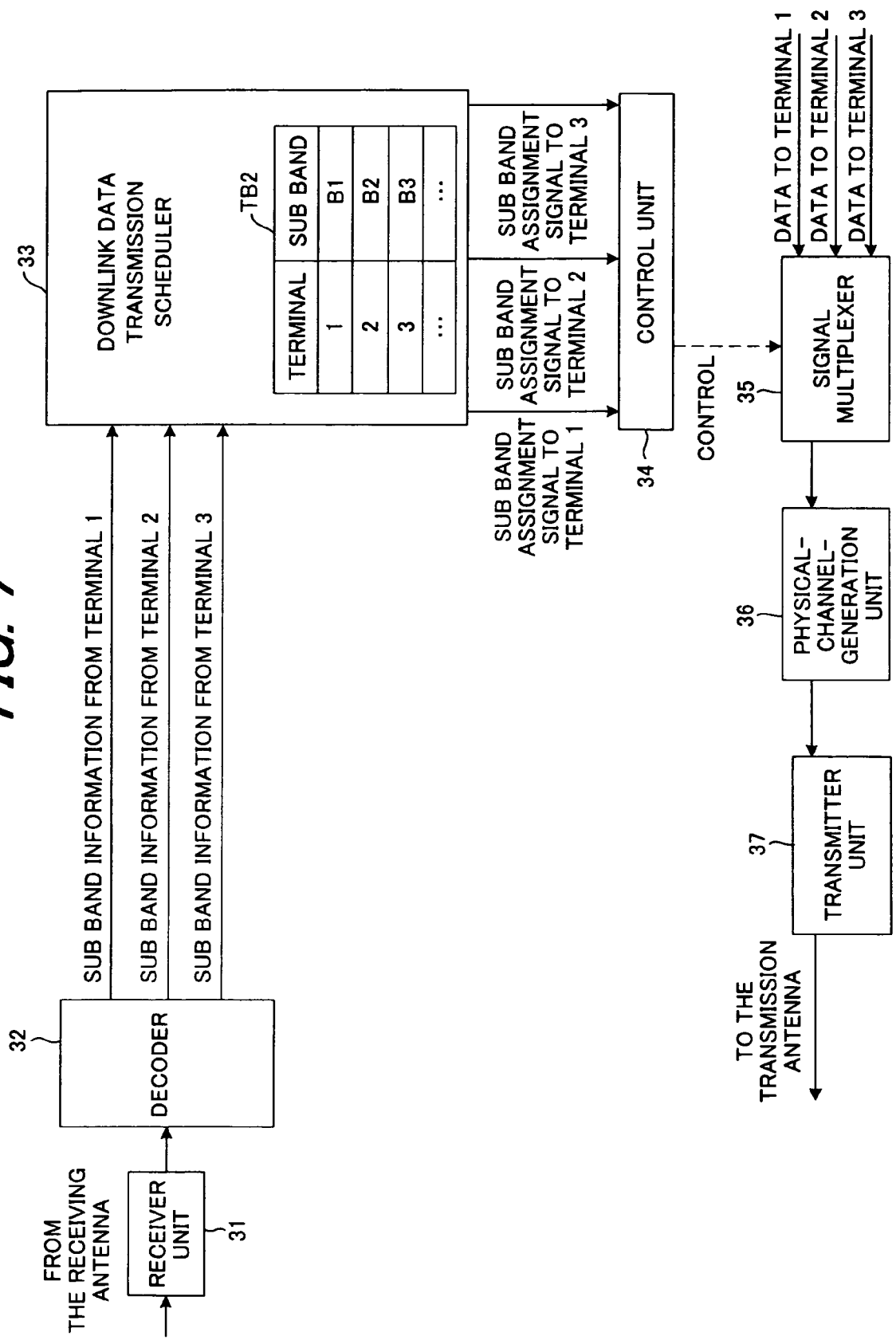
FIG. 7 is a drawing showing the construction of the base station of a first embodiment of the invention.
Figure 8:
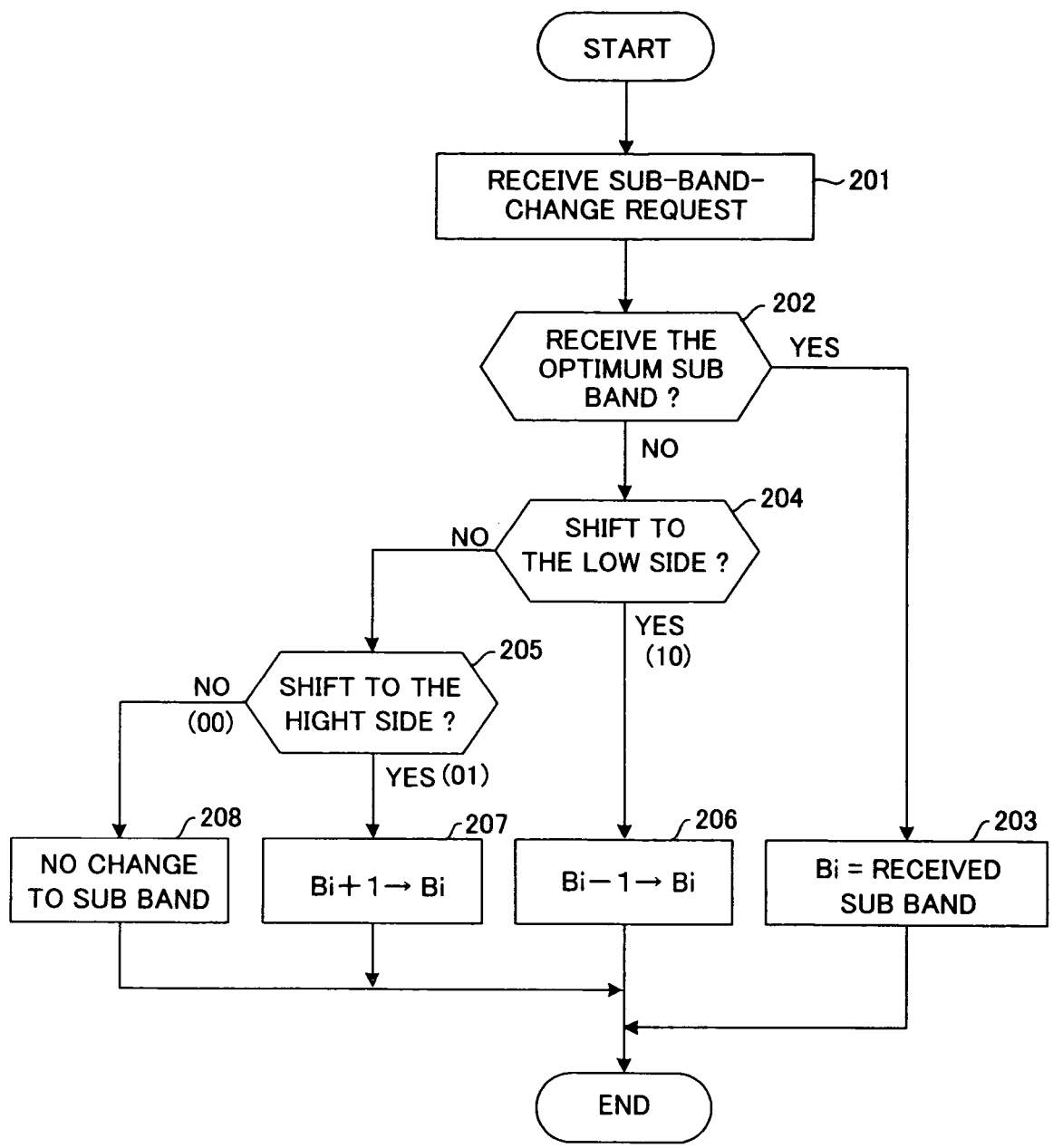
FIG. 8 is a flowchart showing the processing flow by the base station for changing the sub band.

FIG. 7 is a drawing showing the construction of a base station, and FIG. 8 is a flowchart showing the processing flow by the base station for changing the sub band.

At the base station, a receiver unit 31 receives radio signals from each terminal, then performs down conversion of the frequency to a baseband frequency and inputs the signals to a decoder 32. The decoder 32 decodes the control signals from each terminal, extracts sub band related information from each terminal (see FIG. 4) and inputs it to a downlink data transmission scheduler 33 (step 201). The scheduler 33 refers to the mode-setting bit MSB for each terminal and checks whether the control signal includes a sub-band-ID number, or includes a sub-band-change-request command (step 202).

When the mode-setting bit MSB of the control information received from a pre determined terminal is '1', or in other words, when a sub-band-ID number is included in the control information, the scheduler 33 updates the optimum sub band number Bi for that terminal that is held in an internal correspondence table TBL with the received sub band ID number (step 203). On the other hand, in step 202, when the mode-setting bit MSB is '0', or in other words, when a sub-band-change-request command is included in the control information, the scheduler 33 checks whether that command is '00', '10' or '01' (steps 204, 205), and when it is '10', determines a shift of the sub band to the lower side, and updates the optimum sub band number Bi of the terminal held in the table TBL according to the following equation (step 206).

$$Bi-1 \to Bi$$

Also, when the command is '01' the scheduler determines a shift to the higher side, and updates the optimum sub band number Bi of the terminal held in the table TBL according to the following equation (step 207).

$$Bi+1=Bi$$

Moreover, when the command is '00', the scheduler determines to maintain the current sub band and does not change the sub band for the interested terminal (step 208).

After the sub-band update process has been completed for all terminals, the scheduler 33 notifies a control unit 34 of the optimum sub band for each terminal, and the control unit 34 controls a signal multiplexer 35 so as to perform frequency multiplexing of data for each user with the notified sub band, then a physical-channel-generation unit 36 generates a physical channel data using the multiplexed data for each terminal, and a transmitter unit 37 modulates all of the respective physical-channel data, performs up conversion of the modulated-data frequency to a radio frequency and transmits it to each respective terminal from an antenna.

In the explanation above, a terminal generates a sub-band-change-request command using 2 bits as shown in (B) of FIG. 2, and transmits that command to a base station, however, a similar explanation is also possible in which a sub-band-change-request command as shown in (A) of FIG. 2 or (C) of FIG. 2 is generated.

With this first embodiment of the invention, it is possible to effectively reduce the number of bits used for specifying a sub band, as well as it is possible to notify a base station of the optimum sub band at a high rate of frequency while at the same time suppressing the consumption amount of radio resources, and thus good transmission between the base station and a terminal becomes possible.

Also, with this first embodiment, both an all-common pilot measurement mode and limited pilot measurement mode are used together, so it is possible to notify a base station of the optimum sub band with a high reliability.

Moreover, with this first embodiment, it is no longer necessary to always perform pilot measurement for all sub bands, and it is possible to perform pilot measurement for all sub bands only when the radio communication environment becomes poor, and thus it is possible to improve data throughput of the base station.

(C) Second Embodiment
(a) Overview of the Second Embodiment

Figure 9:
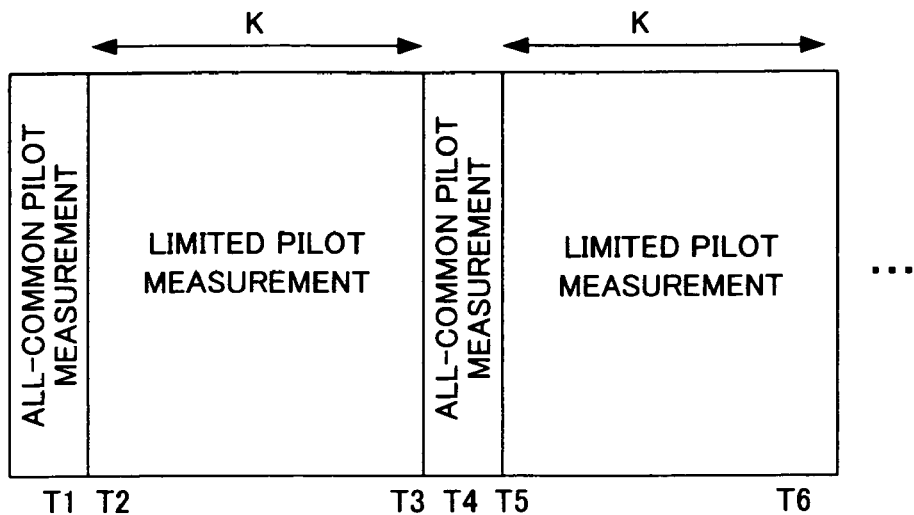
FIG. 9 is a drawing explaining a second embodiment in which a terminal uses together both an all-common pilot measurement mode and a limited pilot measurement mode to notify a base station of the optimum sub band.

FIG. 9 is a drawing explaining a second embodiment in which a terminal uses together both an all-common pilot measurement mode and a limited pilot measurement mode to notify a base station of the optimum sub band.

At the start of data transmission (time T1), a terminal MS performs radio measurement of all sub bands in the all-common pilot measurement mode, and notifies a base station of the ID number of the optimum sub band. Next, for a period of k number of continuous TTI (T2 to T3), the terminal MS sends a sub-band-change request to the base station in the limited pilot measurement mode. After that, at time T4, the terminal MS changes back to the all-common pilot measurement mode, performs radio measurement for all sub bands and notifies the base station of the ID number of the optimum sub band. After that, each time the terminal MS sends a sub-band-change request to the base station in the limited pilot measurement mode for a period of k number of continuous TTI, it repeats the operation of changing to the all-common pilot measurement mode for a period of one TTI.

Figure 10:
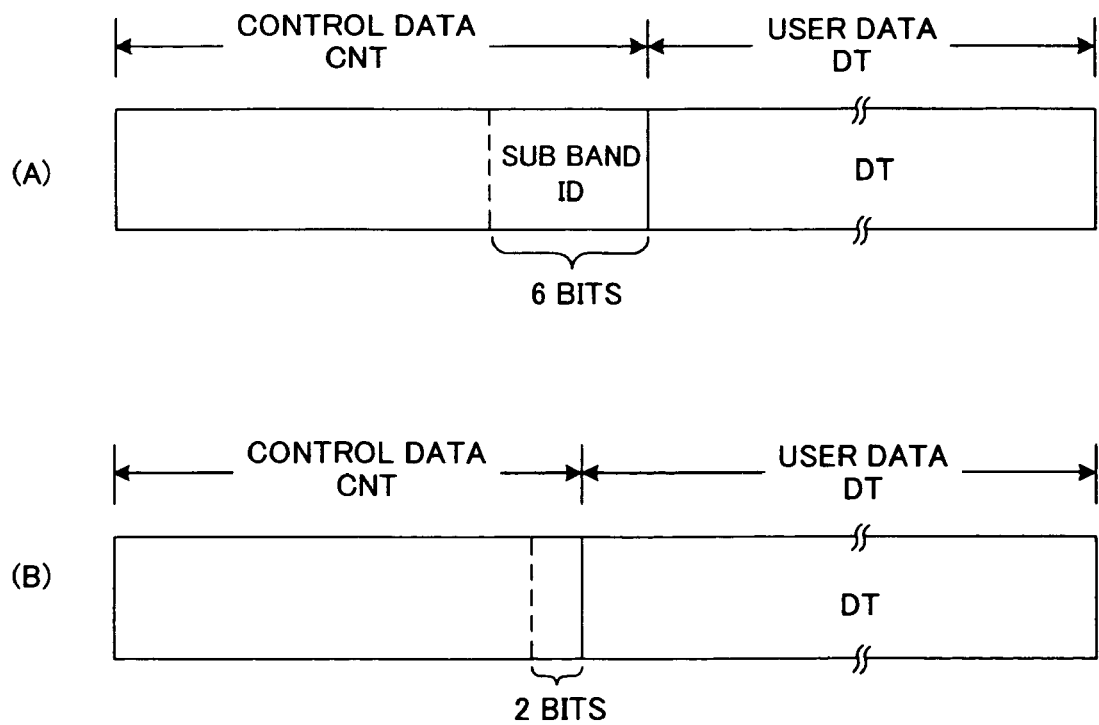
FIG. 10 is a drawing explaining the control data of a second embodiment of the invention.

As shown in FIG. 9, when the number of times k that the limited pilot measurement mode is repeated is fixed, then as shown in FIG. 10, in the second embodiment, there is no need for a mode-setting bit MSB in the control data, and thus it becomes possible to widen the data transmission band by that amount. In (A) of FIG. 10, an example of control data and user data in the all-common pilot measurement mode is shown, and (B) of FIG. 10 shows an example of control data and user data in limited pilot measurement mode.

The value of k is either a preset value, or a value that adaptively changes to correspond to the movement speed of the terminal. In the case of the former, a value for k that is noted in the radio system specifications is used. In the case of the latter, the terminal (or the base station or a control apparatus on the network) determines the value by using a certain algorithm according to the radio link quality or operating environment (movement speed, etc.) of the terminal, and that value is shared between the terminal and the base station. In this case, the terminal notifies the base station of this value k, or the mode-setting bit MSB shown in FIG. 4 is necessary in the control data.

(b) Construction and Operation of the Terminal

Figure 11:
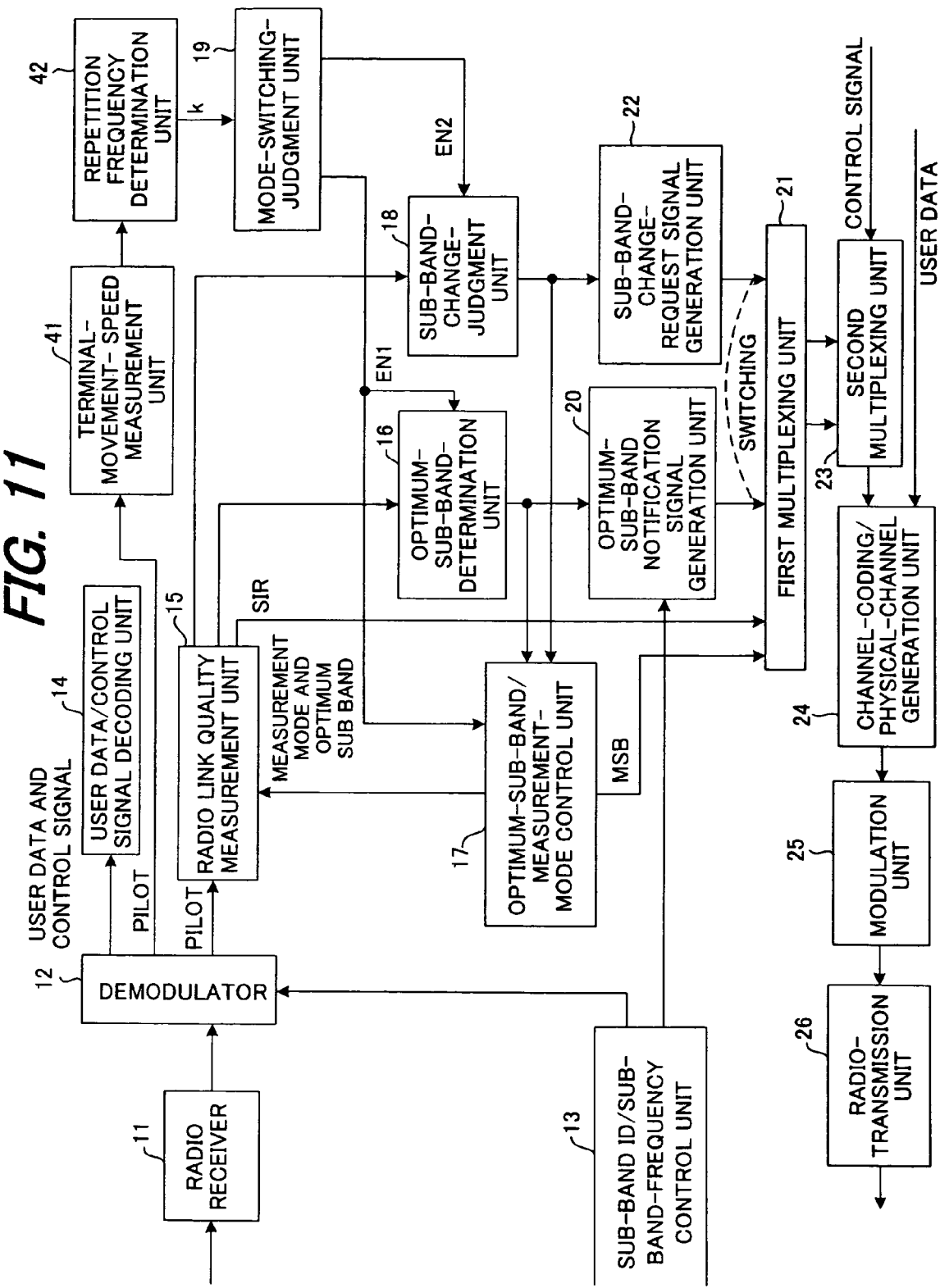
FIG. 11 is a drawing showing the construction of a terminal of a second embodiment of the invention.

FIG. 11 is a drawing showing the construction of the terminal of a second embodiment of the invention, and shows the construction of a terminal that adaptively controls the number of times k with which the limited pilot measurement mode is repeated according to the radio link quality or operating environment of the terminal (movement speed, etc.), where the same reference numbers are given to parts that are the same as those of the first embodiment shown in FIG. 6. This embodiment differs in that: (1) there is a terminal-movement-speed measurement unit 41, and a repetition frequency determination unit 42 that determines the number of times k that the limited pilot measurement is repeated; and (2) the mode-switching-judgment unit 19 performs mode-switching judgment based upon the number of times k.

The terminal-movement-speed measurement unit 41 estimates the Doppler frequency using the common pilot signals, for example, and then estimates the movement speed of a mobile terminal based on that estimated Doppler frequency and inputs the result to the repetition frequency determination unit 42. The faster the terminal movement speed is, the faster the speed of change of the SIR is, so when the terminal movement speed is fast, the repetition frequency determination unit 42 decreases the number of times k that the limited pilot measurement mode described in FIG. 9 is repeated, and when the movement speed is slow, increases the number of times k that repetition is performed.

The mode-switching-judgment unit 19 switches the measurement mode so that the all-common pilot measurement mode is performed once each time the limited pilot measurement mode having a period of TTI has been performed k times, and together with inputting the mode-switch signal to the optimum-sub-band/measurement-mode control unit 17, inputs properly each of the enable signals EN1, EN2 to the optimum-sub-band-determination unit 16 and sub-band-change-judgment unit 18.

FIG. 11 is an example in which the number of times k that limited pilot measurement is performed is controlled based on the movement speed of the terminal, however, k can also be constant, and in that case, the terminal-movement-speed measurement unit 41 and repetition frequency determination unit 42 are not necessary.

With this second embodiment of the invention, both an all-common pilot measurement mode and limited pilot measurement mode are used together, so it is possible to notify a base station of the optimum sub band with high reliability.

Also, with this second embodiment, it is not necessary to always perform pilot measurement for all sub bands, the all-common pilot measurement mode can be performed only once each time the limited pilot measurement mode has been performed a set number of times k, and it is not necessary to notify the base station of mode information when notifying the base station of the sub band, so it is possible to reduce the amount of control data.

Moreover, with the second embodiment of the invention, the number of times k that limited pilot measurement is repeated is controlled according to the radio link quality or the movement speed of the terminal, so it becomes possible to optimally control the number of repetitions k.

(D) Third Embodiment
(a) Overview of the Third Embodiment

Figure 12:
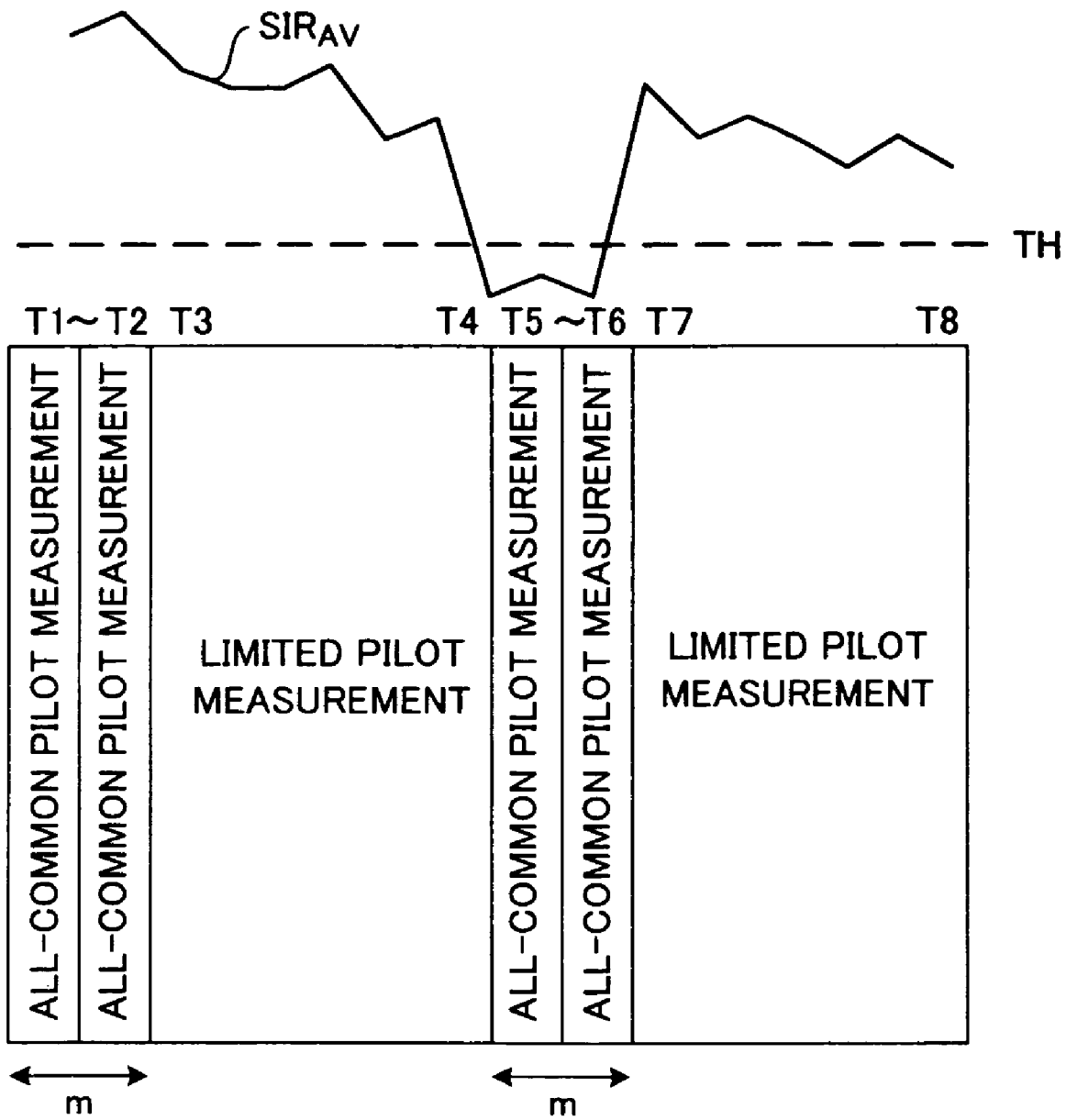
FIG. 12 is a drawing explaining a third embodiment in which a terminal uses together both an all-common pilot measurement mode and a limited pilot measurement mode to notify a base station of the optimum sub band.

FIG. 12 is a drawing explaining a third embodiment in which a terminal uses together both an all-common pilot measurement mode and a limited pilot measurement mode to notify a base station of the optimum sub band, where this embodiment differs from the first embodiment in that in the all-common pilot measurement mode, the radio link quality is measured for all sub bands form number of continuous TTI, and the optimum sub band is determined based on that average value.

At the start of data transmission (T1 to T2), the terminal MS measures the radio link quality (SIR or SNR) for all of the sub bands using all-common pilots for m number of continuous TTI, and determines the optimum sub band based on the average value over a m×TTI period, then notifies the base station of the ID number for that optimum sub band (all-common pilot measurement mode). The value for m can be a preset value, or a value that is adaptively set to correspond with the radio link quality, terminal movement speed, or the like.

After that (T3 to T4), the terminal MS is in the limited pilot measurement mode, and using a relative sub band decision method, sends a sub-band-change request to the base station BS. In this limited pilot measurement mode, the terminal MS monitors whether the limited pilot measurement mode becomes no longer desirable, and when it is no longer desirable, changes back to the all-common pilot measurement mode (T5 to T6), and determines the optimum sub band based on the average value over a m×TTI period, then notifies the base station of the ID number for that optimum sub band. After that, the terminal MS changes back again to the limited pilot measurement mode, and repeats the control described above (T7 on). The limited pilot measurement mode is made undesirable when the same conditions as those of the first embodiment are satisfied.

(b) Processing Flow of the Terminal

Figure 13:
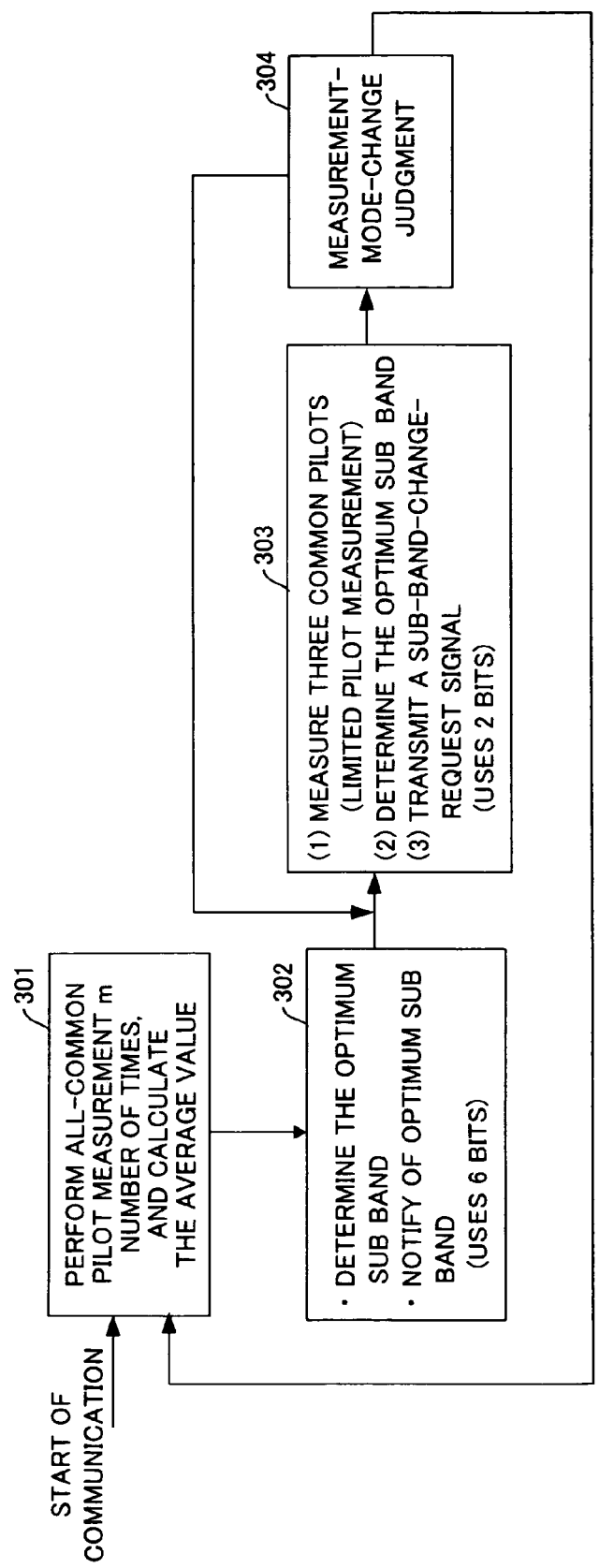
FIG. 13 is a flowchart showing the processing flow of the terminal of a third embodiment of the invention.

FIG. 13 is a flowchart showing the processing flow of the terminal MS of this third embodiment.

At the start of data transmission, the terminal MS is in the all-common pilot measurement mode, and measures the SIR for all sub bands using common pilots Pilot #1 to #60 for all the sub bands for m number of continuous TTI, then calculates the average value over a m×TTI period (step 301). Next, the terminal MS determines the optimum sub band based on the average value of SIR for all sub bands, and as shown in (A) of FIG. 4, notifies the base station BS of the ID number for that optimum sub band using 6 bits (step 302).

After that, the terminal MS changes to the limited pilot measurement mode, and after each TTI; (1) performs radio measurement of the sub band currently being used and both the adjacent sub bands; (2) determines the optimum sub band from among the three; and (3) generates a sub-band-change-request command (see (B) of FIG. 2) based on the determination result, and using that command requests the base station to change the sub band to the sub band having the higher frequency, or to change the sub band to the sub band having the lower frequency, or to not change the sub band (step 303).

In the limited pilot measurement mode in step 303, the terminal MS monitors whether the limited pilot measurement mode is no longer desirable (step 304), and when it is no longer desirable, changes back to the all-common pilot measurement mode (step 301), and after that changes back again to the limited pilot measurement mode (step 302). Following this, the operation described above is repeated.

(c) Construction and Operation of the Terminal

Figure 14:
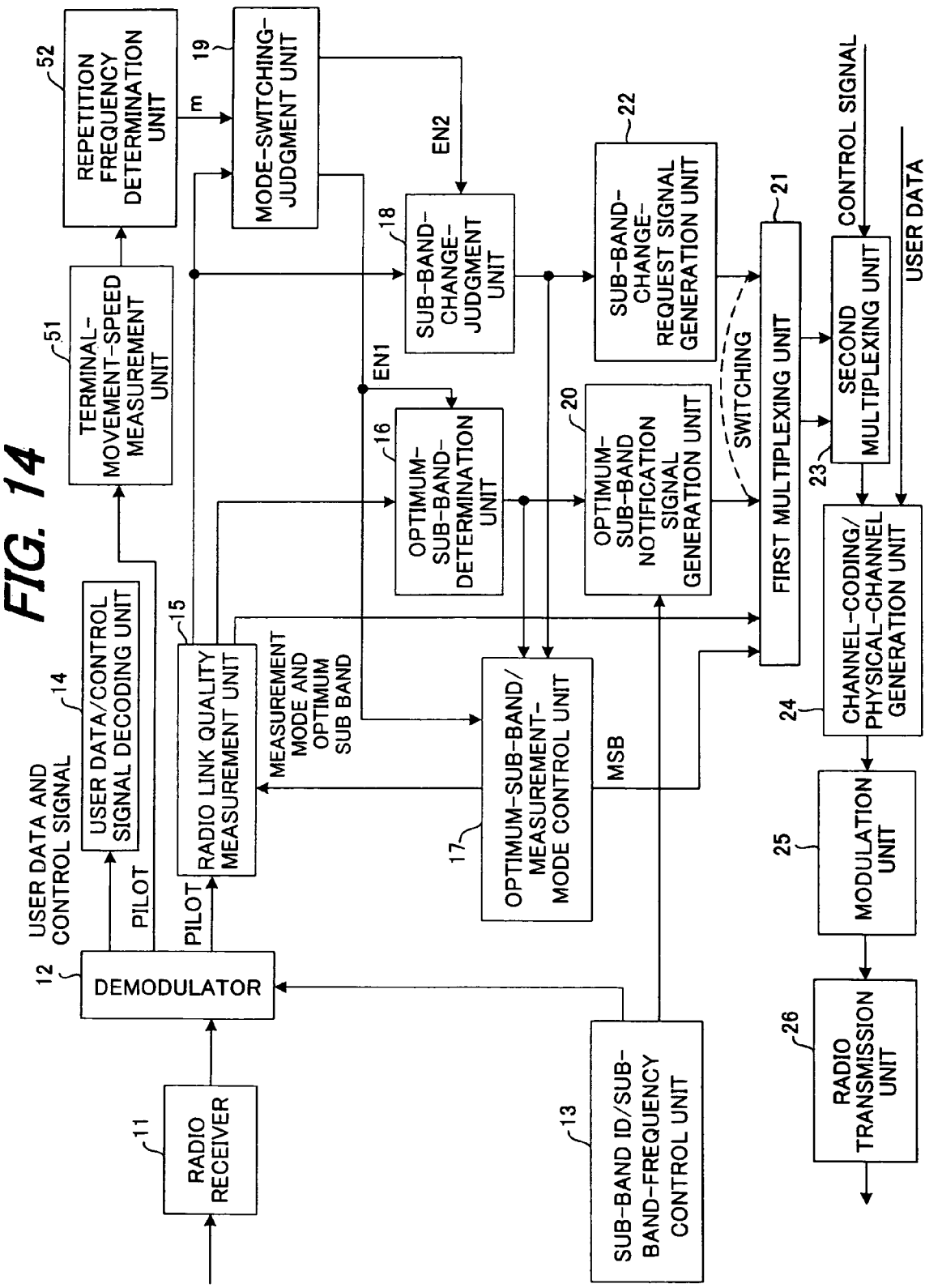
FIG. 14 is a drawing showing the construction of a terminal of a third embodiment of the invention.

FIG. 14 is a drawing showing the construction of the terminal of this third embodiment, and is a drawing showing construction of the case in which the terminal adaptively changes the number of times m that the all-common pilot measurement mode is repeated in correspondence to the radio link quality or operation environment of the terminal (movement speed, etc.), where the same reference numbers are given to parts that are the same as those of the first embodiment shown in FIG. 1. This embodiment differs in that: (1) there is a terminal-movement-speed measurement unit 51, and a repetition frequency determination unit 52 that determines the number of times m that the all-common pilot measurement mode is repeated; and (2) the optimum-sub-band-determination unit 16 determines the optimum sub band based upon the average value of the measurement results.

The terminal-movement-speed measurement unit 51 estimates the Doppler frequency using common pilot signals, for example, and estimates the movement speed of the terminal based on that estimated Doppler frequency, then inputs the result to the repetition frequency determination unit 52. The faster the terminal movement speed is, the faster the SIR changes, so when the terminal movement speed is fast, the repetition frequency determination unit 52 increases the number of times m that the all-common pilot measurement mode explained in FIG. 12 is repeated, and when the terminal movement speed is slow, decreases the number of times m that the mode is repeated.

In the limited pilot measurement mode, the mode-switching-judgment unit 19 monitors whether the limited pilot measurement to determine when it is no longer desirable, and when it is no longer desirable, inputs the measurement-mode change to the optimum-sub-band/measurement-mode control unit 17, and sets the enable signal EN1 to high level and enable signal EN2 to low level.

The optimum-sub-band/measurement-mode control unit 17 immediately inputs the all-common pilot measurement mode to the radio link quality measurement unit 15 as the measurement mode. By doing this, the radio link quality measurement unit 15 measures the radio link quality of each sub band using the common pilots Pilot #1 to Pilot #60 of all sub bands, and inputs the results to the optimum-sub-band-determination unit 16.

When the enable signal EN1 becomes high level, the optimum-sub-band-determination unit 16 determines the optimum sub band based on the average value of the measurement results over a j×TTI (where the initial value of j is 1) period, and together with increasing j+1=j), inputs the optimum sub band to the optimum-sub-band notification signal generation unit 20. The optimum-sub-band notification signal generation unit 20 acquires the ID number of that optimum sub band and inputs it to the first multiplexing unit 21. After that, the terminal transmits the ID number of that optimum sub band to the base station. When j=m, the optimum-sub-band-determination unit 16 determines the optimum sub band #M based on the average value of the measurement results over a m×TTI period, and inputs that optimum sub band to the optimumsub-band notification signal generation unit 20 and to the optimum-sub-band/measurement-mode control unit 17.

The optimum-sub-band notification signal generation unit 20 acquires the ID number of that optimum sub band #M and inputs it to the first multiplexing unit 21. After that, the terminal transmits the ID number of that optimum sub band #M to the base station. Also, after the optimum sub band #M has been input, the optimum-sub-band/measurement-mode control unit 17 saves it, then changes the measurement mode to the limited pilot measurement mode and inputs that limited pilot measurement mode and the optimum sub band #M to the radio link quality measurement unit 15. After that, the limited pilot measurement mode is set and the operation described above is repeated.

FIG. 14 shows an example of adaptively controlling the number of times m that the all-common pilot measurement mode is repeated, however m can also be fixed, and in that case the terminal-movement-speed measurement unit 51 and repetition frequency determination unit 52 are not necessary.

With this third embodiment, both an all-common pilot measurement mode and limited pilot measurement mode are used together, so it is possible to notify the base station of the optimum sub band with high reliability.

Also, with this third embodiment, it is not necessary to always perform pilot measurement of all sub bands, and pilot measurement for all sub bands is performed only when the radio communication environment becomes poor, so it is possible to improve the data throughput of the base station.

Moreover, with this third embodiment, the number of times m that all-common pilot measurement is performed is controlled according to the radio link quality or movement speed of the terminal, so optimum control of the number of times m of repetition is possible.

(E) Examples of Change
(a) First Example of Change

Figure 15:
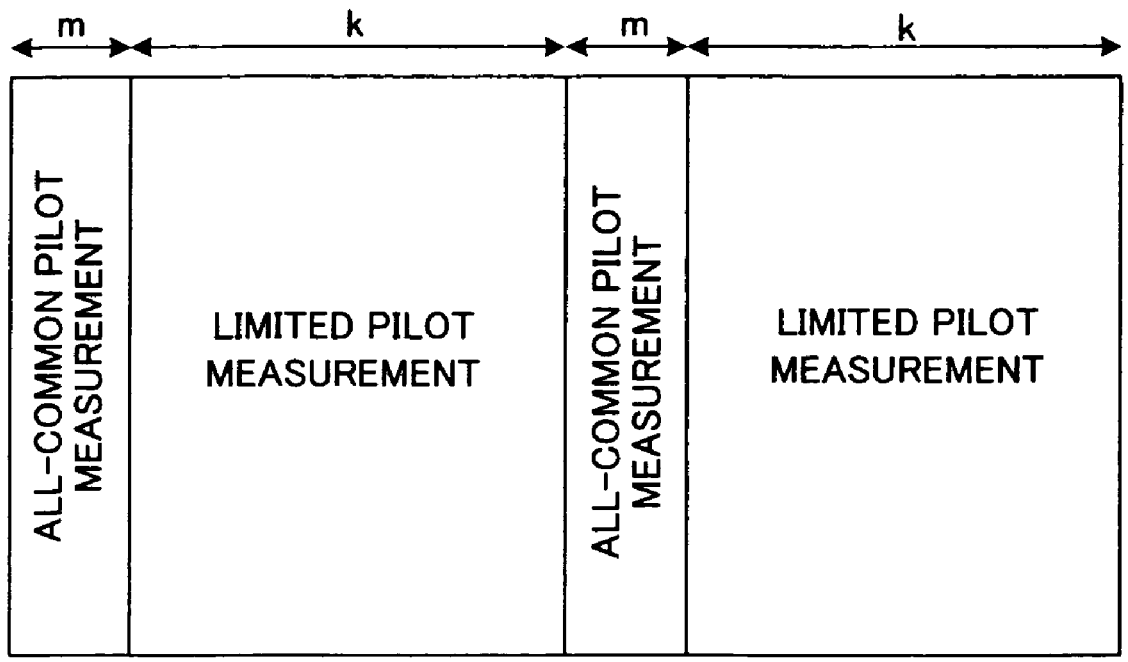
FIG. 15 is a drawing explaining a first change to the invention.

The second and third embodiments are embodiments in which the number of times k that the limited pilot measurement mode is repeated, and the number of times m that the all-common pilot measurement mode is repeated, are controlled individually, however, as shown in FIG. 15, construction is possible in which both k and m can be controlled at the same time.

(b) Second Example of Change

Figure 16:
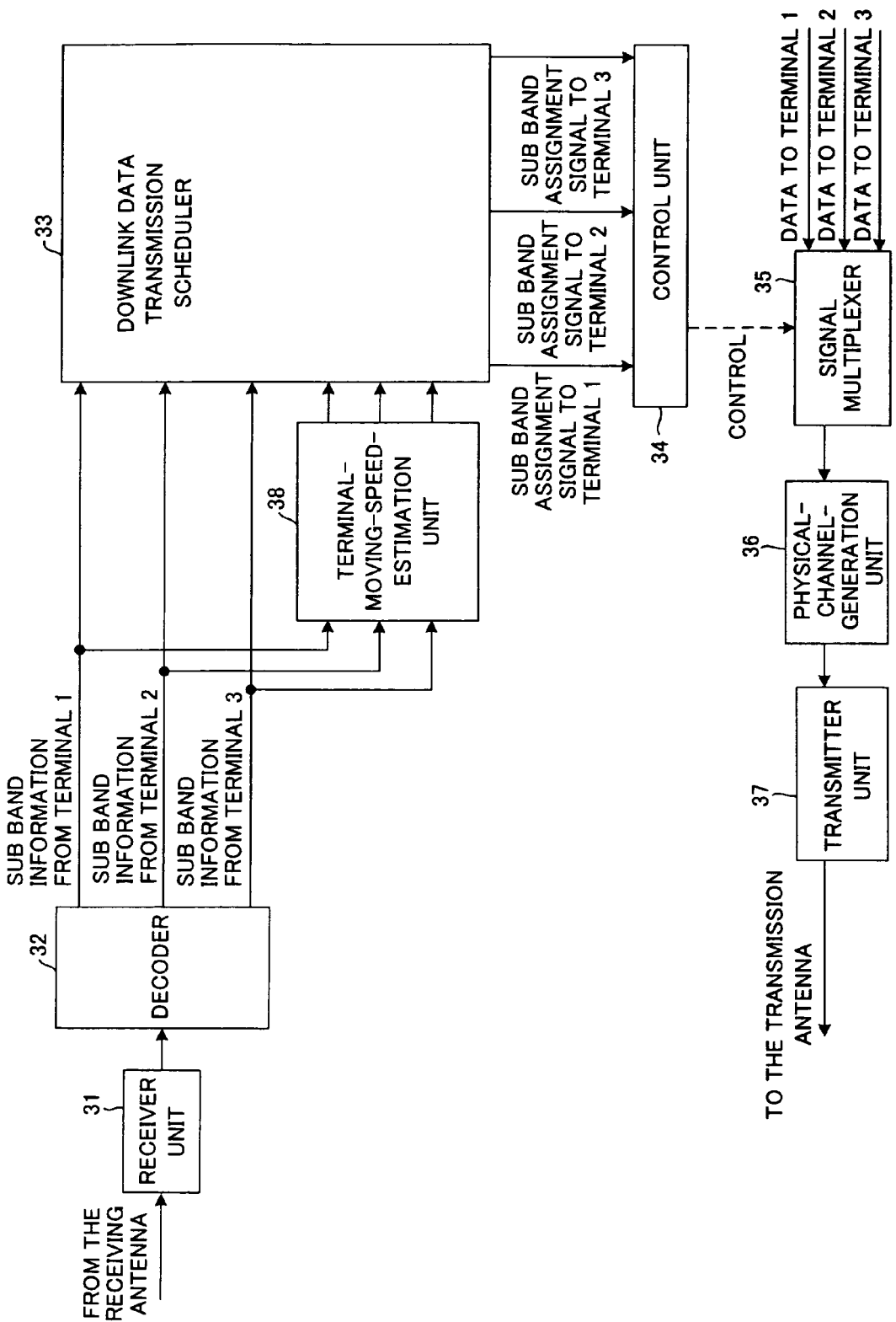
FIG. 16 is a drawing showing the construction of the base station of a second change to the invention.
Figure 17:
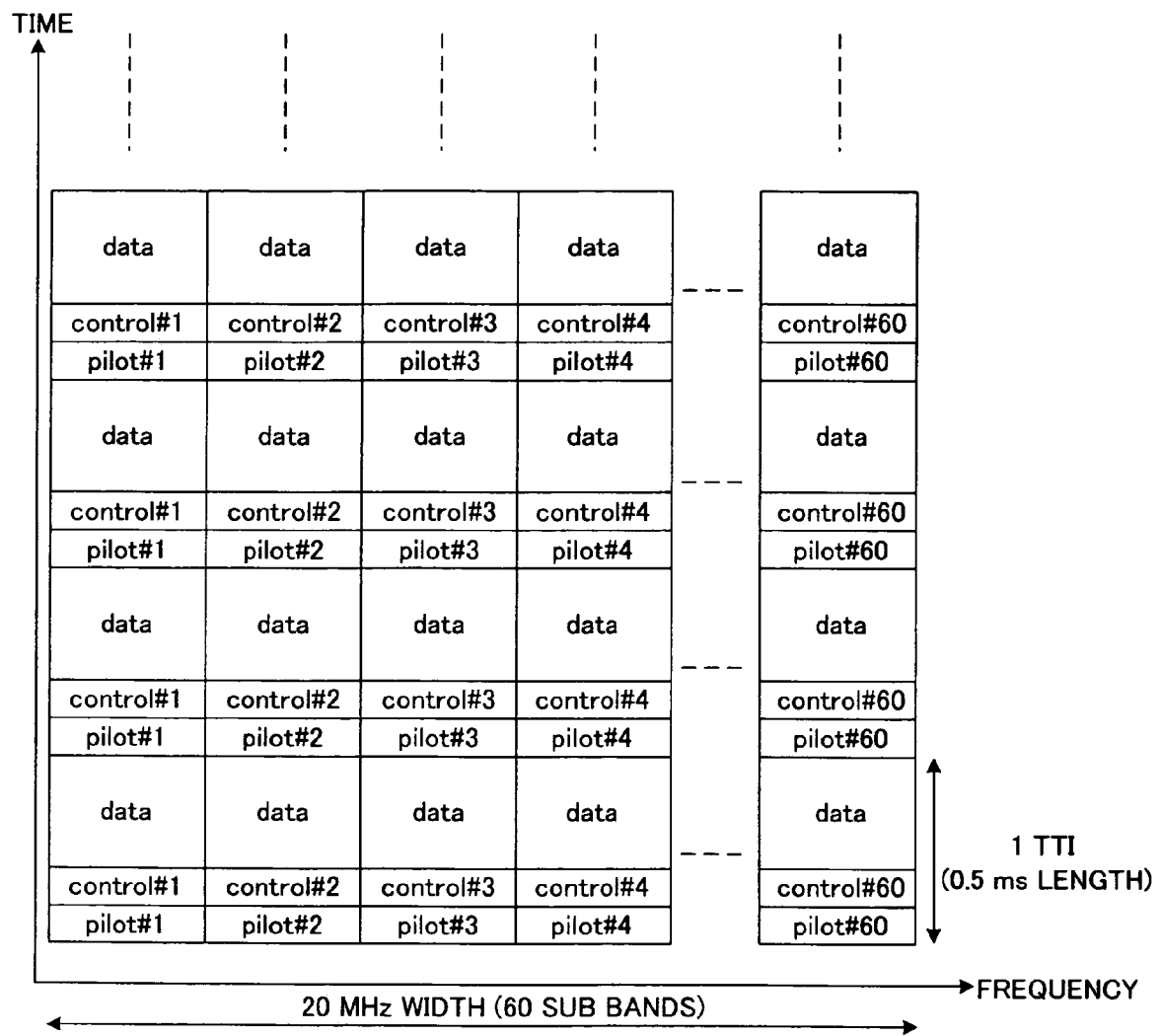
FIG. 17 is a drawing showing an example of a radio frame in the downlink.
Figure 18:
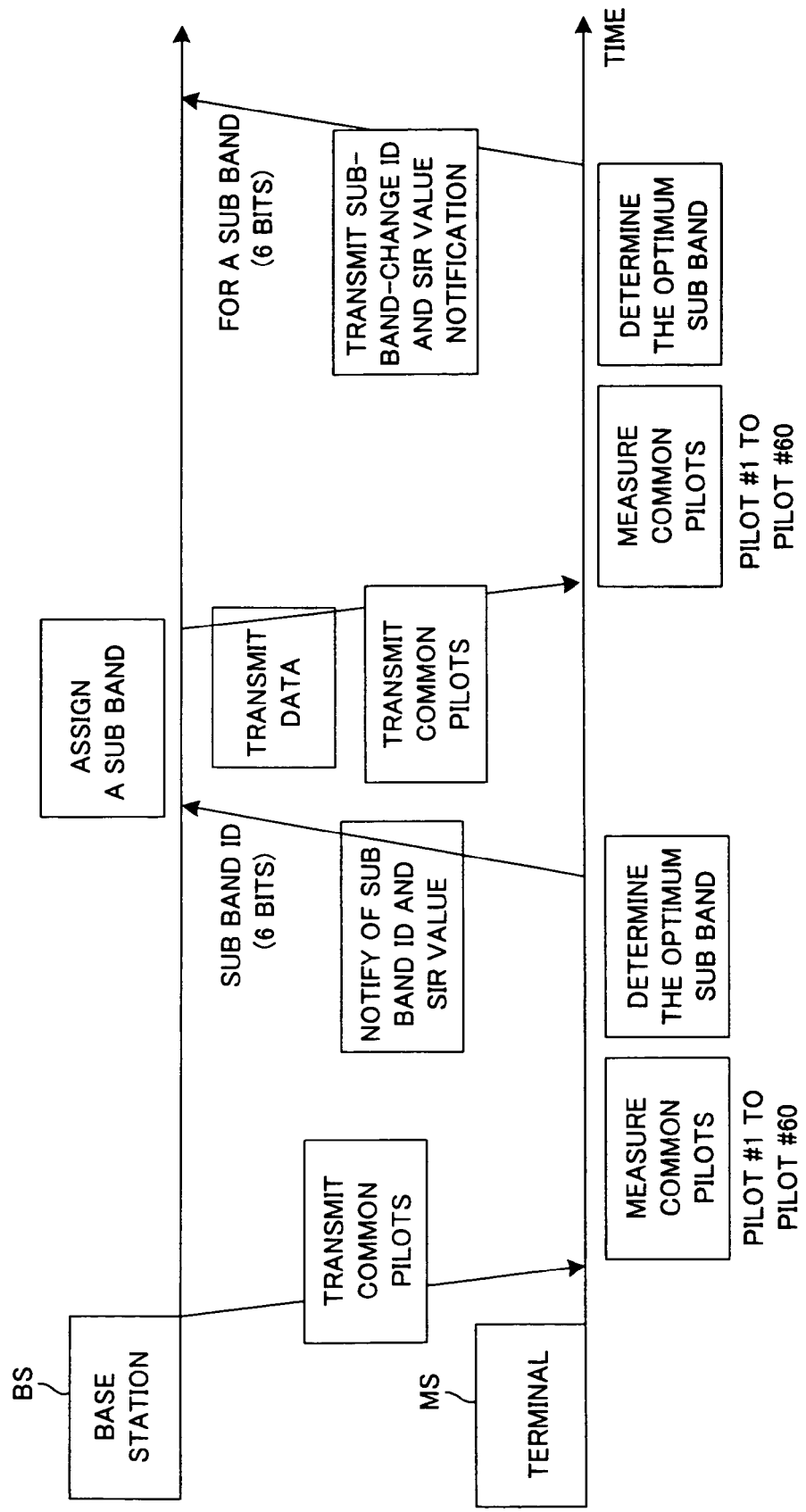
FIG. 18 is a drawing explaining a prior sub band notification method.

The embodiment of the base station shown in FIG. 7 is an embodiment in which a data-transmission scheduler 33 assigns a sub band for each terminal based on the optimum sub bands received from each terminal, however, as shown in FIG. 16, construction is possible in which there is a terminal-movement-speed-estimation unit 38, and the data-transmission scheduler 33 assigns a sub band for each terminal taking into consideration the optimum sub band information received from the terminals and movement speed of the terminals. In this case, the terminal determines the optimum sub band for that terminal based on user ID information included in the control signal, for example.

As many apparently widely different embodiments of the present invention can be made without departing from the spirit and scope thereof, it is to be understood that the invention is not limited to the specific embodiments thereof except as defined in the appended claims.

What is claimed is:

1. A sub band notification method for notifying a base station from a terminal of an optimum sub band that is determined based on radio link quality of a plurality of sub bands, comprising:

measuring the radio link quality of a terminal for a current sub band which is currently assigned to the terminal and the radio link quality of the terminal for a sub band on each side of the current sub band;

comparing said link quality of each sub band, and generating sub-band-change-request data that specifies that the optimum sub band is a sub band having a higher frequency than the current sub band, or a sub band having a lower frequency;

transmitting said sub-band-change-request data to the base station; and specifying by said sub-band-change-request data whether said optimum sub band is the nth adjacent sub band having a higher frequency than the current sub band, or the nth adjacent sub band having a lower frequency, and setting the value of n to a fixed value, or controlling the value of n according to the radio link quality.

2. The sub band notification method of claim 1 further comprising:

measuring by a terminal the radio link quality of all sub bands at the start of transmission and determining the sub band having the best quality to be the optimum sub band, then notifying the base station of an ID number of that sub band.

3. The sub band notification method of claim 1 wherein said sub-band-change-request data comprises 2 bits, and whereby those 2 bits specify whether said optimum sub band is the sub band having a higher frequency than the current sub band, or is the sub band having a lower frequency, or whether to maintain the current sub band as said optimum sub band.

4. The sub band notification method of claim 1 wherein said sub-band-change-request data comprises 3 bits, and whereby those 3 bits specify whether said optimum sub band is a first or second adjacent sub band having a higher frequency than the current sub band, or is a first or second adjacent sub band having a lower frequency, or whether to maintain the current sub band as said optimum sub band.

5. A sub band notification method for notifying a base station from a terminal of an optimum sub band that is determined based on radio link quality of a plurality of sub bands, comprising:

measuring the radio link quality of a terminal for a current sub band which is currently assigned to the terminal and the radio link quality of the terminal for a sub band on each side of the current sub band;

comparing said link quality of each sub band, and generating sub-band-change-request data that specifies that the optimum sub band is a sub band having a higher frequency than the current sub band, or a sub band having a lower frequency;

transmitting said sub-band-change-request data to the base station;

monitoring whether conditions are met for changing from a first mode to a second mode, in the first mode the radio link quality of the current sub band is compared with that of the sub bands on both sides of the current sub band, and said sub-band-change-request data is transmitted to the base station from the terminal, and in the second mode the radio link quality of all of the sub bands are measured and the base station is notified of the ID number of the sub band having the best radio link quality;

measuring the radio link quality of all sub bands when said conditions are met, and notifying the base station of the ID number of the sub band having the best quality; and then changing back to said first mode.

6. The sub band notification method of claim 5 comprising:
identifying in said second mode the sub band having the best radio link quality based on the average value of m number of radio link measurements, and setting the value of m to a fixed value, or controlling the value of m according to the radio link quality.

7. A sub band notification method for notifying a base station from a terminal of an optimum sub band that is determined based on radio link quality of a plurality of sub bands, comprising:
measuring the radio link quality of a terminal for a current sub band which is currently assigned to the terminal and the radio link quality of the terminal for a sub band on each side of the current sub band;
comparing said link quality of each sub band, and generating sub-band-change-request data that specifies that the optimum sub band is a sub band having a higher frequency than the current sub band, or a sub band having a lower frequency;
transmitting said sub-band-change-request data to the base station;
determining whether the number of times that sub-band-change-request data has been continuously generated has reached a specified number of times k in a first mode, in which the radio link quality of the current sub band is compared with that of the sub bands on both sides of that sub band, and said sub-band-change-request data is transmitted to the base station from the terminal;
changing from the first mode to a second mode, when the number of times that said sub-band-change-request data has been continuously generated has reached said specified number of times k, measuring the radio link quality for all sub bands in the second mode, and notifying the base station of the ID number of the sub band having the best radio link quality; and
then changing back to said first mode.

8. The sub band notification method of claim 7 comprising setting the value of k to a fixed value, or controlling the value of k according to the radio link quality.

9. The sub band notification method of claim 1 comprising:
saving a sub-band ID number after the ID number of the sub band having the best radio link quality is received from the terminal, and transmitting data to that terminal using that sub band;
updating said saved optimum sub band based on received data when control data is received from said terminal specifying that the optimum sub band is a sub band having a higher frequency than the current sub band, or a sub band having a lower frequency; and
transmitting data to the terminal using the updated sub band.

10. A terminal apparatus for notifying a base station of an optimum sub band from among a plurality of sub bands that is determined based on radio link quality, and comprising:
a radio-quality-measurement unit that measures the radio link quality of a current sub band that is currently assigned to the terminal apparatus and the radio link quality of a sub band on each side of the current sub band;
an optimum-sub-band-determination unit that compares said link quality of each sub band, and determines whether the optimum sub band is a sub band having a higher frequency than the current sub band, or a sub band having a lower frequency;
a sub-band-change-request data creation unit that generates sub-band-change-request data based on said determination; and
a transmission unit that transmits the sub-band-change-request data to the base station, wherein
the sub-band-change-request data creation unit generates the sub-band-change-request data that specifies whether said optimum sub band is the nth adjacent sub band having a higher frequency than the current sub band, or the nth adjacent sub band having a lower frequency, and sets the value of n to a fixed value, or controls the value of n according to the radio link quality.

11. A terminal apparatus for notifying a base station of an optimum sub band from among a plurality of sub bands that is determined based on radio link quality, and comprising:
a radio-quality-measurement unit that measures the radio link quality of a current sub band that is currently assigned to the terminal apparatus and the radio link quality of a sub band on each side of the current sub band;
an optimum-sub-band-determination unit that compares said link quality of each sub band, and determines whether the optimum sub band is a sub band having a higher frequency than the current sub band, or a sub band having a lower frequency;
a transmission unit that generates sub-band-change-request data based on said determination, and transmits that sub-band-change-request data to the base station; and
a measurement-mode change judgment unit that determines whether conditions are satisfied for changing to a second mode, in a first mode, the radio link quality of the current sub band and the sub bands on both sides of the current sub band are compared and said sub-band-change-request data is transmitted to the base station, and in the second mode the radio link quality for all of the sub bands are measured and the base station is notified of an ID number of the sub band having the best radio link quality, wherein
when said conditions are satisfied, said optimum-sub-band-determination unit refers to the radio link quality of all of the sub bands that are output from said radio quality-measurement unit, and determines the sub band having the best quality as the optimum sub band, and said transmission unit notifies the base station of the ID number of that sub band.

12. A terminal apparatus for notifying a base station of an optimum sub band from among a plurality of sub bands that is determined based on radio link quality, and comprising:
a radio-quality-measurement unit that measures the radio link quality of a current sub band that is currently assigned to the terminal apparatus and the radio link quality of a sub band on each side of the current sub band;
an optimum-sub-band-determination unit that compares said link quality of each sub band, and determines whether the optimum sub band is a sub band having a higher frequency than the current sub band, or a sub band having a lower frequency;
a transmission unit that generates sub-band-change-request data based on said determination, and transmits that sub-band-change-request data to the base station; and
a measurement-mode change judgment unit for determining whether the number of times that sub-band-change-request data has been continuously generated has reached a specified number of times k in a first mode, in which the radio link quality of the current sub band and the sub bands on both sides of the current sub band are compared and said sub-band-change-request data is transmitted to the base station; and wherein when the number of times that said sub-band-change-request data has been generated has reached said specified number of times k, said optimum-sub-band determination unit changes a mode from the first mode to a second mode, and in the second mode, refers to the radio link quality of all of the sub bands that are output from said radio-quality-measurement unit, and determines the sub band having the best quality as the optimum sub band, and said transmission unit notifies the base station of an ID number of the optimum sub band.

13. The terminal apparatus of claim 11 or claim 12 wherein, when in said second mode said optimum-sub-band-determination unit identifies the sub band having the base quality based on the average value of m number of radio link measurements, a unit is provided for controlling the value of m according to the radio link quality.

14. The terminal apparatus of claim 12 comprising a unit that controls said value of k according to the radio link quality.

15. A base station apparatus that uses a plurality of sub bands to perform frequency-division-multiplexing transmission for transmitting data to a plurality of terminals, and comprising:

a memory unit that, when a sub-band ID number is received from a terminal as the ID number of the sub band having the best radio link quality, saves said sub-band ID number in correspondence with the terminal;

an update-control unit that, when control data is received from said terminal specifying that the optimum sub band is a sub band having a higher frequency than the current sub band, or is a sub band having a lower frequency, updates said saved optimum sub band based on that received data; and a data-transmission unit that uses the optimum sub band for each terminal to transmit data to the terminal wherein the terminal 1) measures the radio link quality for a current sub band which is currently assigned to the terminal, the radio link quality for a nth adjacent sub band having a higher frequency than the current sub band and the radio link quality for a nth adjacent sub band having a lower frequency, and compares said link quality of each sub band, 2) generates the control data that specifies that whether said optimum sub band is the nth adjacent sub band having a higher frequency than the current sub band, or the nth adjacent sub band having a lower frequency, and sets the value of n to a fixed value, or controls the value of n according to the radio link quality and 3) transmits the control data to the base station.

* * * * *